(12) United States Patent
Kroger et al.

(10) Patent No.: US 10,724,435 B2
(45) Date of Patent: Jul. 28, 2020

(54) INLET PRE-SWIRL GAS TURBINE ENGINE

(71) Applicant: General Electric Company, Schenectady, NY (US)

(72) Inventors: Christopher James Kroger, West Chester, OH (US); Brandon Wayne Miller, Liberty Township, OH (US); Trevor Wayne Goerig, Cincinnati, OH (US); David William Crall, Loveland, OH (US); Tsuguji Nakano, West Chester, OH (US); Jeffrey Donald Clements, Mason, OH (US); Bhaskar Nanda Mondal, Bangalore (IN)

(73) Assignee: General Electric Co., Schenectady, NY (US)

( * ) Notice: Subject to any disclaimer, the term of this patent is extended or adjusted under 35 U.S.C. 154(b) by 387 days.

(21) Appl. No.: 15/625,186

(22) Filed: Jun. 16, 2017

(65) Prior Publication Data

US 2018/0363677 A1 Dec. 20, 2018

(51) Int. Cl.
*F02C 7/04* (2006.01)
*F02K 3/06* (2006.01)
*F04D 29/56* (2006.01)
*F04D 29/68* (2006.01)
*F04D 29/54* (2006.01)

(52) U.S. Cl.
CPC .................. *F02C 7/04* (2013.01); *F02K 3/06* (2013.01); *F04D 29/542* (2013.01); *F04D 29/563* (2013.01); *F04D 29/681* (2013.01); *F04D 29/684* (2013.01); *F05D 2220/32* (2013.01); *F05D 2250/182* (2013.01); *F05D 2250/51* (2013.01); *F05D 2260/14* (2013.01)

(58) Field of Classification Search
CPC ........................................................ F02C 7/04
See application file for complete search history.

(56) References Cited

U.S. PATENT DOCUMENTS

| 4,254,619 A | 3/1981 | Giffin, III et al. |
| 4,981,414 A * | 1/1991 | Sheets ...................... F01D 5/145 |
| | | 415/149.1 |
| 5,458,457 A | 10/1995 | Goto et al. |

(Continued)

OTHER PUBLICATIONS

Bobula et al., Effect of a part-span variable inlet guide vane on the performance of a high-bypass turbofan engine, https://ntrs.nasa.gov/search.jsp?R=19810016546, Aircraft Propulsion and Power, NASA-TM-82617, E-869, AVRADCOM-TR-81-C-10, Seventeenth Joint Propulsion Conf.; Colorado Springs, CO; Jul. 27-29 1981; 15 pages.

(Continued)

*Primary Examiner* — Woody A Lee, Jr.
(74) *Attorney, Agent, or Firm* — Dority & Manning, P.A.

(57) ABSTRACT

A gas turbine engine includes a turbomachine and a fan rotatable by the turbomachine. The fan includes a plurality of fan blades. The gas turbine engine also includes an outer nacelle surrounding the plurality of fan blades and a plurality of part-span inlet guide vanes cantilevered from the outer nacelle at a location forward of the plurality of fan blades along the axial direction. Each of the plurality of inlet guide vanes defines an inner end along the radial direction and it is unconnected with an adjacent part-span inlet guide vane at the inner end.

20 Claims, 16 Drawing Sheets

(56) References Cited

U.S. PATENT DOCUMENTS

| | | | |
|---|---|---|---|
| 5,904,470 A | 5/1999 | Kerrebrock et al. | |
| 6,409,469 B1 | 6/2002 | Tse | |
| 6,546,734 B2 | 4/2003 | Antoine et al. | |
| 7,114,911 B2 | 10/2006 | Martin et al. | |
| 7,600,370 B2 | 10/2009 | Dawson | |
| 7,694,505 B2 | 4/2010 | Schilling | |
| 7,811,049 B2 | 10/2010 | Xu | |
| 7,845,902 B2 | 12/2010 | Merchant | |
| 8,061,969 B2 | 11/2011 | Durocher et al. | |
| 8,152,445 B2 | 4/2012 | Guemmer | |
| 8,292,574 B2 * | 10/2012 | Wood | F01D 5/142 415/199.5 |
| 8,459,035 B2 | 6/2013 | Smith et al. | |
| 8,915,700 B2 | 12/2014 | Kupratis et al. | |
| 2006/0133930 A1 * | 6/2006 | Aggarwala | F01D 5/145 415/191 |
| 2008/0131272 A1 | 6/2008 | Wood et al. | |
| 2008/0159851 A1 * | 7/2008 | Moniz | F01D 5/147 415/159 |
| 2009/0074568 A1 | 3/2009 | Suciu et al. | |
| 2010/0260591 A1 | 10/2010 | Martin et al. | |
| 2011/0241344 A1 * | 10/2011 | Smith | F01D 1/30 290/52 |
| 2011/0286834 A1 | 11/2011 | Wardle et al. | |
| 2013/0019585 A1 | 1/2013 | Merry et al. | |
| 2014/0193238 A1 | 7/2014 | Sheridan et al. | |
| 2015/0027101 A1 | 1/2015 | Hasel | |
| 2015/0089958 A1 | 4/2015 | Suciu et al. | |
| 2015/0096303 A1 | 4/2015 | Schwarz et al. | |
| 2015/0252752 A1 | 9/2015 | Suciu | |
| 2015/0345392 A1 | 12/2015 | Merry et al. | |
| 2015/0345426 A1 | 12/2015 | Houston et al. | |
| 2015/0369046 A1 | 12/2015 | Roberge | |
| 2016/0061052 A1 | 3/2016 | Suciu et al. | |
| 2016/0084265 A1 * | 3/2016 | Yu | F04D 29/542 415/1 |
| 2016/0114894 A1 | 4/2016 | Schwarz et al. | |
| 2016/0201568 A1 | 7/2016 | Sheridan et al. | |
| 2016/0201607 A1 | 7/2016 | Gallagher et al. | |
| 2016/0312799 A1 * | 10/2016 | Yu | F04D 29/667 |
| 2017/0292227 A1 | 10/2017 | Kim | |
| 2017/0297728 A1 | 10/2017 | Niergarth et al. | |
| 2018/0163627 A1 | 6/2018 | Suciu et al. | |
| 2018/0355802 A1 | 12/2018 | Sheridan | |
| 2018/0356095 A1 | 12/2018 | Patel et al. | |
| 2018/0363554 A1 | 12/2018 | Kroger et al. | |
| 2018/0363676 A1 | 12/2018 | Kroger et al. | |
| 2018/0363678 A1 * | 12/2018 | Kroger | F04D 29/563 |

OTHER PUBLICATIONS

Kandebo et al., "Geared-Turbofan Engine Design Targets Cost Complexity", Aviation Week and Space Technology, Mcgraw-Hill Compagny, New York, NY, US, vol. 148, No. 8, Feb. 23. 1998, pp. 34-35, XP008174450.

Mattingly et al., Aircraft Engine Design, 2002, American Institute of Aeronautics and Astronautics, 2nd Edition, p. 292.

United States Office Action Corrresponding with U.S. Appl. No. 15/625,212, dated Jun. 17, 2019.

\* cited by examiner

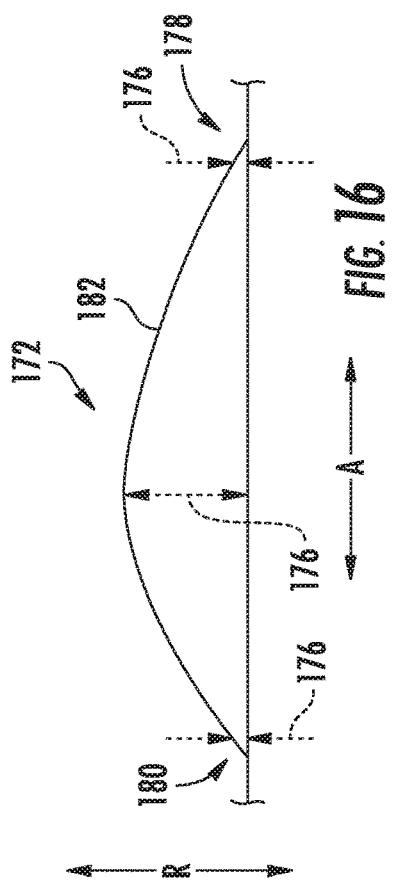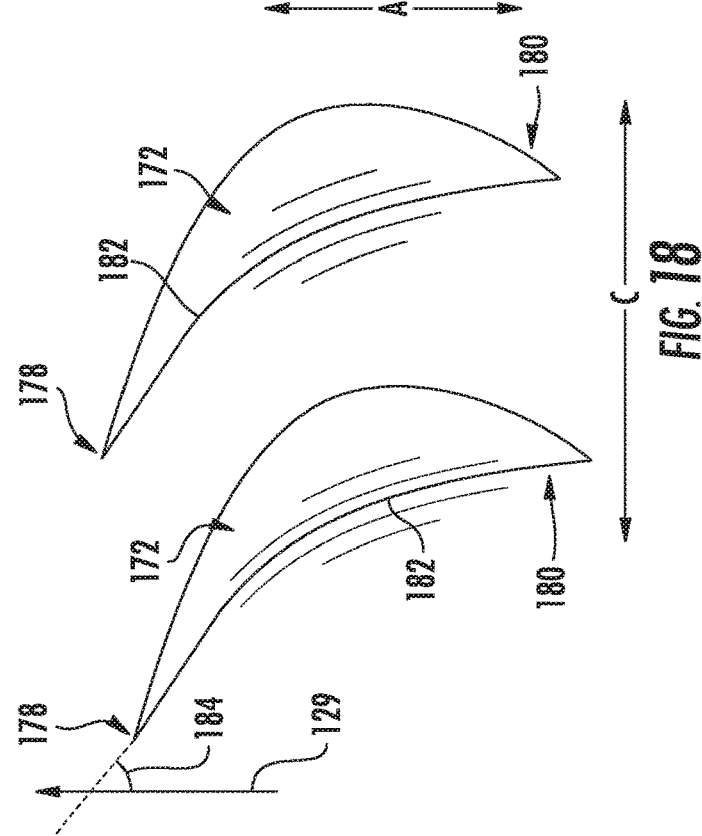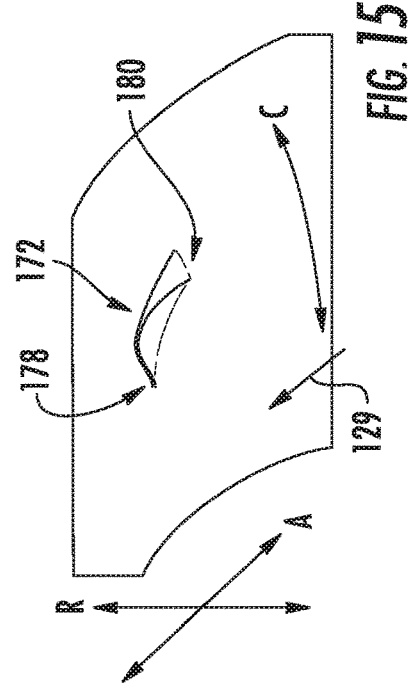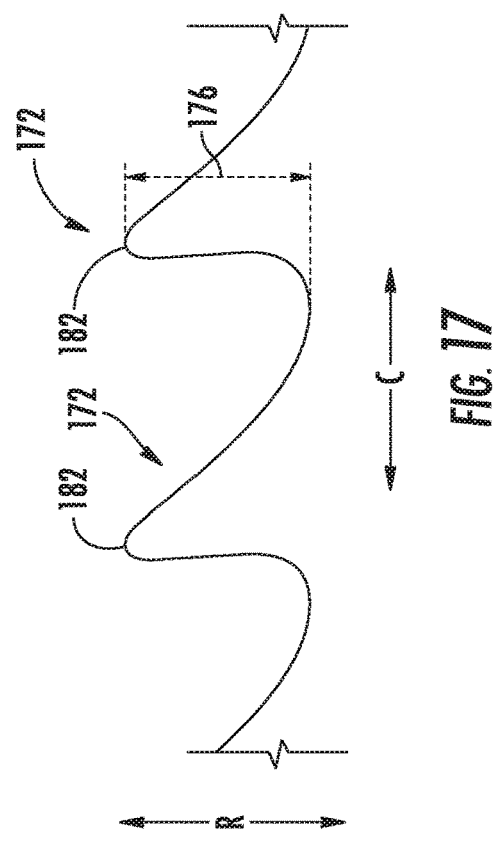

INLET PRE-SWIRL GAS TURBINE ENGINE

FIELD

The present subject matter relates generally to a gas turbine engine having one or more features for pre-swirling an airflow provided to a fan of the gas turbine engine during operation.

BACKGROUND

A gas turbine engine generally includes a fan and a core arranged in flow communication with one another. Additionally, the core of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air using one or more fuel nozzles within the combustion section and burned to provide combustion gases. The combustion gases are routed from the combustion section to the turbine section. The flow of combustion gasses through the turbine section drives the turbine section and is then routed through the exhaust section, e.g., to atmosphere.

Typical gas turbine engines include a drive turbine within the turbine section that is configured to drive, e.g., a low pressure compressor of the compressor section and the fan. In order to operate the gas turbine engine more efficiently, it is desirable to operate the drive turbine at a relatively high rotational speed. However, rotation of the fan at relatively high rotational speeds can lead to inefficiencies, such inefficiencies stemming from, e.g., shock losses and flow separation of an airflow over fan blades of the fan.

Accordingly, certain gas turbine engines have been developed with reduction gearboxes that allow the fan to rotate slower than the drive turbine. However, certain gearboxes may add complication, weight, and expense to the gas turbine engine. Therefore, a gas turbine engine configured to allow the drive turbine to operate at relatively high and efficient rotational speeds, while minimizing corresponding inefficiencies with the fan would be useful.

BRIEF DESCRIPTION

Aspects and advantages of the invention will be set forth in part in the following description, or may be obvious from the description, or may be learned through practice of the invention.

In one exemplary embodiment of the present disclosure, a gas turbine engine is provided. The gas turbine engine defines an axial direction and a radial direction. The gas turbine engine includes a turbomachine and a fan rotatable by the turbomachine. The fan includes a plurality of fan blades. The gas turbine engine also includes an outer nacelle surrounding the plurality of fan blades and a plurality of part-span inlet guide vanes cantilevered from the outer nacelle at a location forward of the plurality of fan blades along the axial direction. Each of the plurality of inlet guide vanes defines an inner end along the radial direction and it is unconnected with an adjacent part-span inlet guide vane at the inner end.

In certain exemplary embodiments the plurality of part-span inlet guide vanes each define an outer end along the radial direction, and wherein each of the plurality of part span inlet guide vanes is connected to the outer nacelle at the outer end.

In certain exemplary embodiments each part-span inlet guide vane is completely supported by the outer nacelle at the respective outer end.

In certain exemplary embodiments the plurality of part-span inlet guide vanes define a solidity between about 0.5 and about 1.5.

In certain exemplary embodiments the plurality of part-span inlet guide vanes define a solidity between about 0.9 and 1.0.

In certain exemplary embodiments each of the plurality of part-span inlet guide vanes are configured as variable part-span inlet guide vanes.

In certain exemplary embodiments the plurality of part-span inlet guide vanes includes between twenty part-span inlet guide vanes and fifty part-span inlet guide vanes.

In certain exemplary embodiments the plurality of part-span inlet guide vanes includes between thirty part-span inlet guide vanes and forty-five part-span inlet guide vanes.

In certain exemplary embodiments each part-span inlet guide vane defines a leading edge, a trailing edge, and a maximum swirl angle, and wherein the maximum swirl angle of each part span inlet guide vane at the trailing edge is between five degrees and thirty-five degrees.

In certain exemplary embodiments each part-span inlet guide vane defines a leading edge, a trailing edge, and a maximum swirl angle, and wherein the maximum swirl angle of each part span inlet guide vane at the trailing edge is between twelve degrees and twenty-five degrees.

In certain exemplary embodiments each part-span inlet guide vane defines a leading edge, a trailing edge, and an outer end along the radial direction, wherein each part span inlet guide vane defines a first swirl angle at the trailing edge proximate the inner end and a second swirl angle at the trailing edge proximate the outer end, and wherein the second swirl angle is greater than the first swirl angle.

In certain exemplary embodiments the inner end of each of the plurality of inlet guide vanes is movable generally along the radial direction between an extended position and a retracted position.

In certain exemplary embodiments the gas turbine engine further defines a circumferential direction, and wherein the plurality of part span inlet guide vanes are spaced substantially evenly along the circumferential direction.

In certain exemplary embodiments the gas turbine engine further defines a circumferential direction, and wherein the plurality of part span inlet guide vanes are spaced unevenly along the circumferential direction.

In certain exemplary embodiments the plurality of part span inlet guide vanes each define a longitudinal axis, wherein the gas turbine engine further defines a circumferential direction, wherein the radial and circumferential directions together define a reference plane, and wherein the longitudinal axis of each part span inlet guide vane intersects the reference plane and defines a sweep angle with the reference plane between about ten degrees and about thirty degrees.

In certain exemplary embodiments the plurality of part span inlet guide vanes each define a trailing edge, wherein the trailing edge of each of the part span inlet guide vanes defines a non-linear sculpted shape.

In certain exemplary embodiments the gas turbine engine further includes a compensation air supply assembly in airflow communication with a high pressure air source to receive a compensation airflow, wherein the plurality of part span inlet guide vanes each define a trailing edge and a trailing edge opening, wherein the trailing edge opening is in airflow communication with the compensation air supply assembly to receive the composition airflow and provide such compensation airflow through the trailing edge opening during operation of the gas turbine engine.

In another exemplary embodiment of the present disclosure, a gas turbine engine defining an axial direction and a radial direction is provided. The gas turbine engine includes a turbomachine and a fan rotatable by the turbomachine. The fan includes a plurality of fan blades. The gas turbine engine further includes an outer nacelle surrounding the plurality of fan blades and a plurality of part-span inlet guide vanes cantilevered from the outer nacelle at a location forward of the plurality of fan blades along the axial direction. Each of the plurality of inlet guide vanes defines an outer end along the radial direction and it is completely supported by the outer nacelle at the respective outer end.

In certain exemplary embodiments each part-span inlet guide vane defines an inner end along the radial direction, and wherein each part span inlet guide vane is unconnected with an adjacent part-span inlet guide vane at the inner end.

In certain exemplary embodiments the plurality of part-span inlet guide vanes define a solidity between about 0.5 and about 1.5.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 15 is a perspective view of a pre-swirl contour of the exemplary gas turbine engine of FIG. 12.

FIG. 16 is a side view of the exemplary pre-swirl contour of the exemplary gas turbine engine of FIG. 12.

FIG. 17 is a lengthwise cross-sectional view of a plurality of pre-swirl contours, including the exemplary pre-swirl contour of the exemplary gas turbine engine of FIG. 12.

FIG. 18 is a top view of a plurality of pre-swirl contours, including the exemplary pre-swirl contour of the exemplary gas turbine engine of FIG. 12.

DETAILED DESCRIPTION

Figure 1:
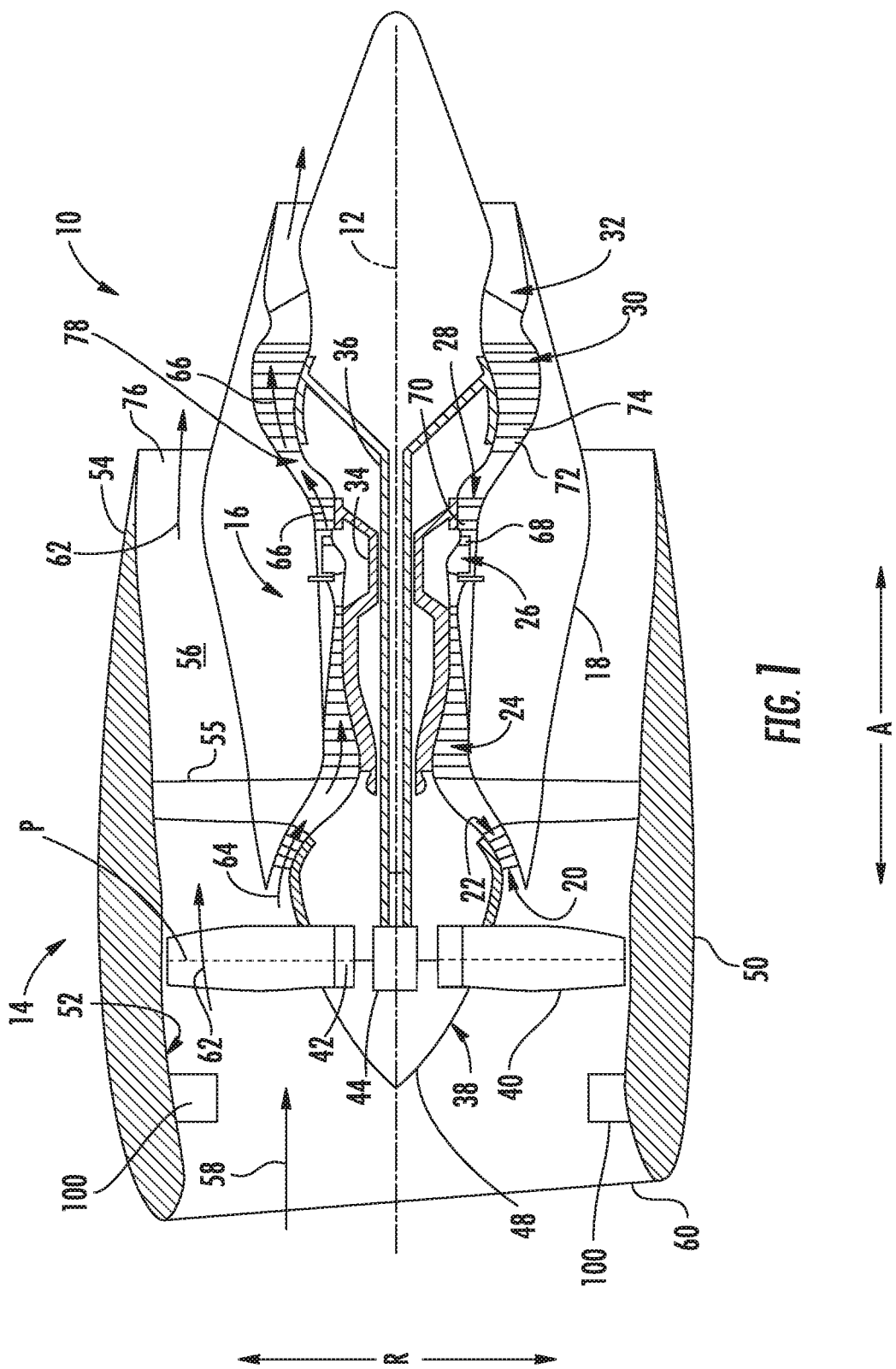
FIG. 1 is a schematic cross-sectional view of an exemplary gas turbine engine according to various embodiments of the present subject matter.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions within a gas turbine engine, with forward referring to a position closer to an engine inlet and aft referring to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, in certain contexts, the approximating language may refer to being within a 10% margin.

Here and throughout the specification and claims, range limitations may be combined and interchanged, such that ranges identified include all the sub-ranges contained therein unless context or language indicates otherwise.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference), a radial direction R, and a circumferential direction (i.e., a direction extending about the axial direction A; see, e.g., FIG. 3). In general, the turbofan 10 includes a fan section 14 and a turbomachine 16 disposed downstream from the fan section 14.

The exemplary turbomachine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. The LP turbine 30 may also be referred to as a "drive turbine".

For the embodiment depicted, the fan section 14 includes a variable pitch fan 38 having a plurality of fan blades 40 coupled to a disk 42 in a spaced apart manner. More specifically, for the embodiment depicted, the fan section 14 includes a single stage fan 38, housing a single stage of fan blades 40. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan 38 is mechanically coupled to and rotatable with the LP turbine 30, or drive turbine. More specifically, the fan blades 40, disk 42, and actuation member 44 are together rotatable about the longitudinal axis 12 by LP shaft 36 in a "direct drive" configuration. Accordingly, the fan 38 is coupled with the LP turbine 30 in a manner such that the fan 38 is rotatable by the LP turbine 30 at the same rotational speed as the LP turbine 30.

Further, it will be appreciated that the fan 38 defines a fan pressure ratio and the plurality of fan blades 40 each define a fan tip speed. As will be described in greater detail below, the exemplary turbofan engine 10 depicted defines a relatively high fan tip speed and relatively low fan pressure ratio during operation of the turbofan engine at a rated speed. As used herein, the "fan pressure ratio" refers to a ratio of a pressure immediately downstream of the plurality of fan blades 40 during operation of the fan 38 to a pressure immediately upstream of the plurality of fan blades 40 during the operation of the fan 38. Also as used herein, the "fan tip speed" defined by the plurality of fan blades 40 refers to a linear speed of an outer tip of a fan blade 40 along the radial direction R during operation of the fan 38. Further, still, as used herein, the term "rated speed" refers to a maximum operating speed of the turbofan engine 10, in which the turbofan engine 10 generates a maximum amount of power.

Referring still to the exemplary embodiment of FIG. 1, the disk 42 is covered by rotatable front hub 48 aerodynamically contoured to promote an airflow through the plurality of fan blades 40. Additionally, the exemplary fan section 14 includes an annular fan casing or outer nacelle 50 that circumferentially surrounds the plurality of fan blades 40 of the fan 38 and/or at least a portion of the turbomachine 16. More specifically, the nacelle 50 includes an inner wall 52 and a downstream section 54 of the inner wall 52 of the nacelle 50 extends over an outer portion of the turbomachine 16 so as to define a bypass airflow passage 56 therebetween. Additionally, for the embodiment depicted, the nacelle 50 is supported relative to the turbomachine 16 by a plurality of circumferentially spaced outlet guide vanes 55.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. For the embodiment depicted, the bypass ratio may generally be between about 7:1 and about 20:1, such as between about 10:1 and about 18:1. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the turbomachine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the turbomachine 16.

It should be appreciated, however, that the exemplary turbofan engine 10 depicted in FIG. 1 and described above is by way of example only, and that in other exemplary embodiments, the turbofan engine 10 may have any other suitable configuration. For example, in other exemplary embodiments, the turbomachine 16 may include any other suitable number of compressors, turbines, and/or shaft or spools. Additionally, the turbofan engine 10 may not include each of the features described herein, or alternatively, may include one or more features not described herein. For example, in other exemplary embodiments, the fan 38 may not be a variable pitch fan. Additionally, although described as a "turbofan" gas turbine engine, in other embodiments the gas turbine engine may instead be configured as any other suitable ducted gas turbine engine.

Referring still to FIG. 1, and as previously discussed, the exemplary turbofan engine 10 depicted in FIG. 1 is configured as a direct drive turbofan engine 10. In order to increase an efficiency of the turbomachine 16, the LP turbine 30 is configured to rotate at a relatively high rotational speed. Given the direct-drive configuration, such also causes the plurality of fan blades 40 of the fan 38 to rotate at a relatively high rotational speed. For example, during operation of the turbofan engine 10 at the rated speed, the fan tip speed of each of the plurality of fan blades 40 is greater than 1,250 feet per second. For example, in certain exemplary embodiments, during operation of the turbofan engine 10 at the rated speed, the fan tip speed of each of the plurality of fan blades 40 may be greater than about 1,350 feet per second, such as greater than about 1,450 feet per second, such as greater than about 1,550 feet per second, such as up to about 2,200 feet per second.

Despite these relatively fan tip speeds, the fan 38 is, nevertheless designed to define a relatively low fan pressure ratio. For example, during operation of the turbofan engine 10 at the rated speed, the fan pressure ratio of the fan 38 is less than 1.5. For example, during operation of the turbofan engine 10 at the rated speed, the fan pressure ratio may be between about 1.15 and about 1.5, such as between about 1.25 and about 1.4.

As will be appreciated, operating the direct drive turbofan engine 10 in such a manner may ordinarily lead to efficiency penalties of the fan 38 due to shock losses and flow separation of an airflow over the fan blades 40, especially at the radially outer tips of the plurality of fan blades 40 of the fan 38. Accordingly, as will be described in much greater detail below, the turbofan engine 10 may further include one or more inlet pre-swirl features upstream of the plurality of fan blades 40 of the fan 38 to offset or minimize such efficiency penalties of the fan 38. With the inclusion of such inlet pre-swirl features, the efficiency gains of the turbomachine 16 due to, e.g., increased rotational speeds of the LP turbine 30, outweigh the above identified potential efficiency penalties.

Figure 2:
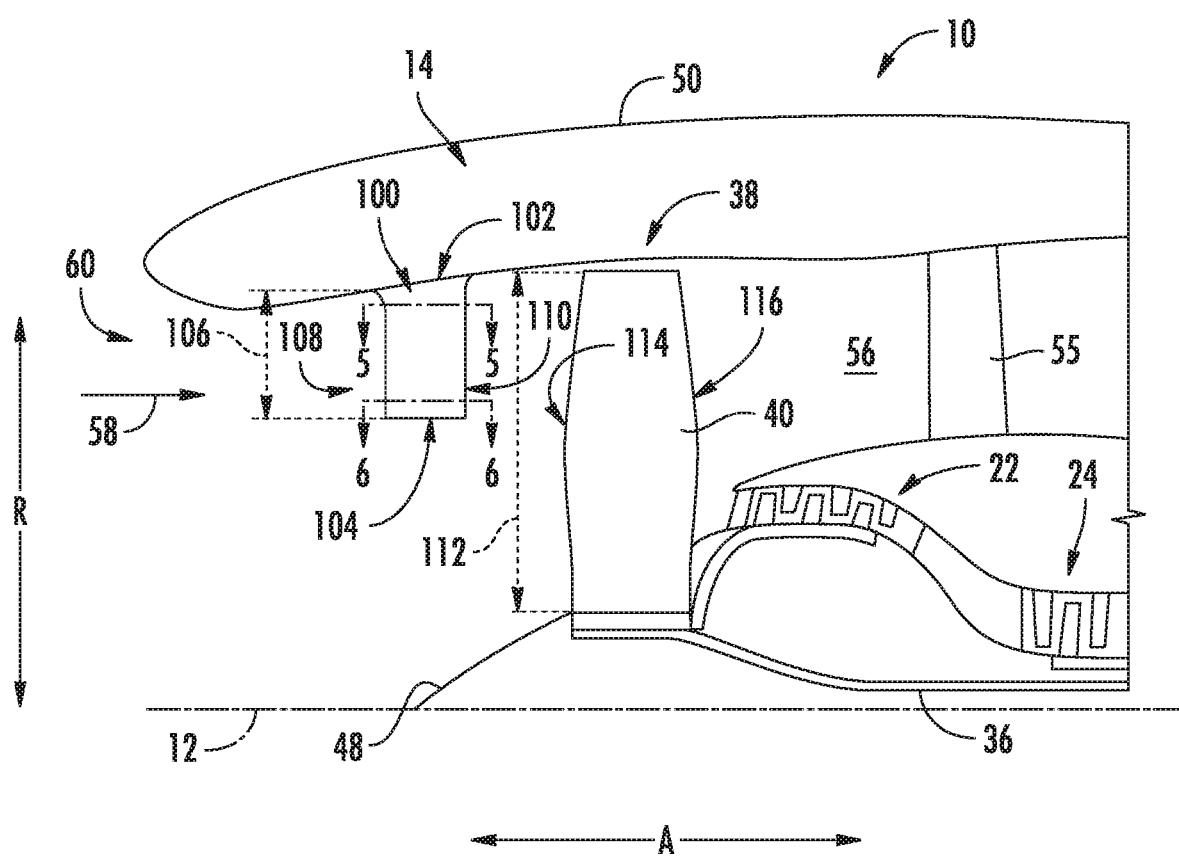
FIG. 2 is a close-up, schematic, cross-sectional view of a forward end of the exemplary gas turbine engine of FIG. 1.

Referring now also to FIG. 2, a close-up, cross-sectional view of the fan section 14 and forward end of the turbomachine 16 of the exemplary turbofan engine 10 of FIG. 1 is provided. As stated, the turbofan engine 10 includes an inlet pre-swirl feature located upstream of the plurality of fan blades 40 of the fan 38 and attached to or integrated into the nacelle 50. More specifically, for the embodiment of FIGS. 1 and 2, the inlet pre-swirl feature is configured as a plurality of part span inlet guide vanes 100. The plurality of part span inlet guide vanes 100 are each cantilevered from of the outer nacelle 50 (such as from the inner wall 52 of the outer nacelle 50) at a location forward of the plurality of fan blades 40 of the fan 38 along the axial direction A and aft of the inlet 60 of the nacelle 50. More specifically, each of the plurality of part span inlet guide vanes 100 define an outer end 102 along the radial direction R, and are attached to/connected to the outer nacelle 50 at the radially outer end 102 through a suitable connection means (not shown). For example, each of the plurality of part span inlet guide vanes 100 may be bolted to the inner wall 52 of the outer nacelle 50 at the outer end 104, welded to the inner wall 52 of the outer nacelle 50 at the outer end 102, or attached to the outer nacelle 50 in any other suitable manner at the outer end 102.

Further, for the embodiment depicted, the plurality of part span inlet guide vanes 100 extend generally along the radial direction R from the outer end 102 to an inner end 104 (i.e., an inner end 104 along the radial direction R). Moreover, as will be appreciated, for the embodiment depicted, each of the plurality of part span inlet guide vanes 100 are unconnected with an adjacent part span inlet guide vane 100 at the respective inner ends 104 (i.e., adjacent part span inlet guide vanes 100 do not contact one another at the radially inner ends 104, and do not include any intermediate connection members at the radially inner ends 104, such as a connection ring, strut, etc.). More specifically, for the embodiment depicted, each part span inlet guide vane 100 is completely supported by a connection to the outer nacelle 50 at the respective outer end 102 (and not through any structure extending, e.g., between adjacent part span inlet guide vanes 100 at a location inward of the outer end 102 along the radial direction R). As will be discussed below, such may reduce an amount of turbulence generated by the part span inlet guide vanes 100.

Moreover, is depicted, each of the plurality of part span inlet guide vanes 100 do not extend completely between the outer nacelle 50 and, e.g., the hub 48 of the turbofan engine 10. More specifically, for the embodiment depicted, each of the plurality of inlet guide vane define an IGV span 106 along the radial direction R, and further each of the plurality of part span inlet guide vanes 100 further define a leading edge 108 and a trailing edge 110. The IGV span 106 refers to a measure along the radial direction R between the outer end 102 and the inner end 104 of the part span inlet guide vane 100 at the leading edge 108 of the part span inlet guide vane 100. Similarly, it will be appreciated, that the plurality of fan blades 40 of the fan 38 define a fan blade span 112 along the radial direction R. More specifically, each of the plurality of fan blades 40 of the fan 38 also defines a leading edge 114 and a trailing edge 116, and the IGV span 106 refers to a measure along the radial direction R between a radially outer tip and a base of the fan blade 40 at the leading edge 114 of the respective fan blade 40.

For the embodiment depicted, the IGV span 106 is at least about five percent of the fan blade span 112 and up to about fifty-five percent of the fan blade span 112. For example, in certain exemplary embodiments, the IGV span 106 may be between about fifteen percent of the fan blade span 112 and about forty-five percent of the fan blade span 112, such as between about thirty percent of the fan blade span 112 and about forty percent of the fan blade span 112.

Figure 3:
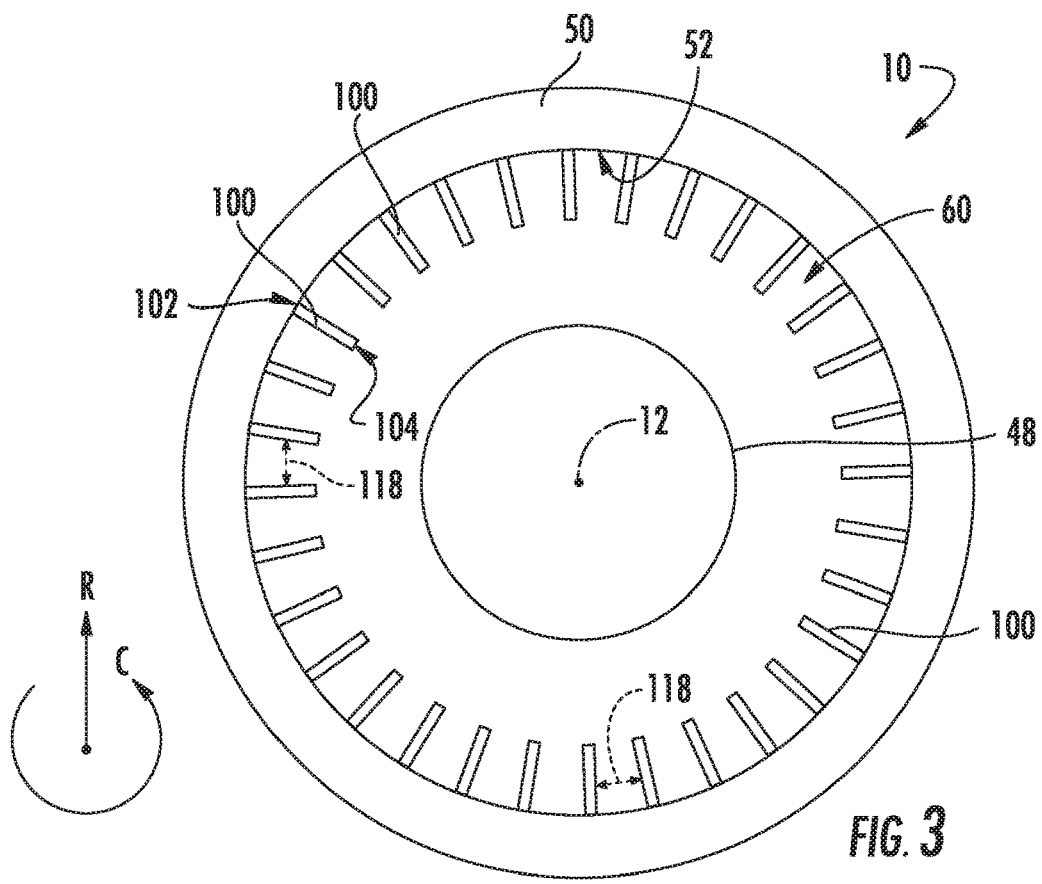
FIG. 3 is a schematic view of an inlet to the exemplary gas turbine engine of FIG. 1, along an axial direction of the gas turbine engine of FIG. 1.

Reference will now also be made to FIG. 3, providing an axial view of the inlet 60 to the turbofan engine 10 of FIGS. 1 and 2. As will be appreciated, for the embodiment depicted, the plurality of part span inlet guide vanes 100 of the turbofan engine 10 includes a relatively large number of part span inlet guide vanes 100. More specifically, for the embodiment depicted, the plurality of part span inlet guide vanes 100 includes between about twenty part span inlet guide vanes 100 and about fifty part span inlet guide vanes 100. More specifically, for the embodiment depicted, the plurality of part span inlet guide vanes 100 includes between about thirty part span inlet guide vanes 100 and about forty-five part span inlet guide vanes 100, and more specifically, still, the embodiment depicted includes thirty-two part span inlet guide vanes 100. Additionally, for the embodiment depicted, each of the plurality of part span inlet guide vanes 100 are spaced substantially evenly along the circumferential direction C. More specifically, each of the plurality of part span inlet guide vanes 100 defines a circumferential spacing 118 with an adjacent part span inlet guide vane 100, with the circumferential spacing 118 being substantially equal between each adjacent part span inlet guide vane 100.

Although not depicted, in certain exemplary embodiments, the number of part span inlet guide vanes 100 may be substantially equal to the number of fan blades 40 of the fan 38 of the turbofan engine 10. In other embodiments, however, the number of part span inlet guide vanes 100 may be greater than the number of fan blades 40 of the fan 38 of the turbofan engine 10, or alternatively, may be less than the number of fan blades 40 of the fan 38 of the turbofan engine 10.

Figure 4:
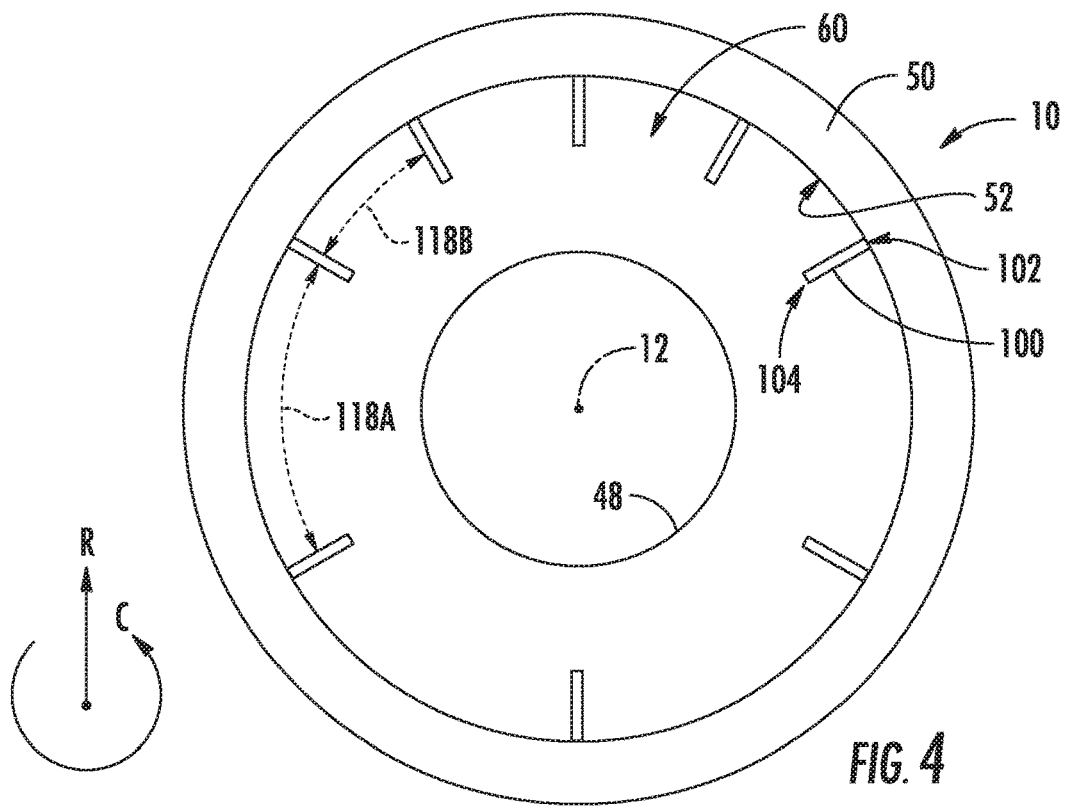
FIG. 4 it is a schematic view of an inlet to a gas turbine engine in accordance with another exemplary embodiment of the present disclosure.

Further, should be appreciated, that in other exemplary embodiments, the turbofan engine 10 may include any other suitable number of part span inlet guide vanes 100 and/or circumferential spacing 118 of the part span inlet guide vanes 100. For example, referring now briefly to FIG. 4, an axial view of an inlet 60 to a turbofan engine 10 in accordance with another exemplary embodiment of the present disclosure is provided. For the embodiment of FIG. 4, the turbofan engine 10 includes less than twenty part span inlet guide vanes 100. More specifically, for the embodiment of FIG. 4, the turbofan engine 10 includes at least eight part span inlet guide vanes 100, or more specifically includes exactly eight part span inlet guide vanes 100. Additionally, for the embodiment of FIG. 4, the plurality of part span inlet guide vanes 100 are not substantially evenly spaced along the circumferential direction C. For example, at least certain of the plurality of part span inlet guide vanes 100 define a first circumferential spacing 118A, while other of the plurality of part span inlet guide vanes 100 define a second circumferential spacing 118B. For the embodiment depicted, the first circumferential spacing 118A is at least about twenty percent greater than the second circumferential spacing 118B, such as at least about twenty-five percent greater such as at least about thirty percent greater, such as up to about two hundred percent greater. Notably, as will be described in greater detail below, the circumferential spacing 118 refers to a mean circumferential spacing between adjacent part span inlet guide vanes 100. The non-uniform circumferential spacing may, e.g., offset structure upstream of the part span inlet guide vanes 100.

Referring now back to the embodiment of FIG. 2, it will be appreciated that each of the plurality of part span inlet guide vanes 100 is configured to pre-swirl an airflow 58 provided through the inlet 60 of the nacelle 50, upstream of the plurality of fan blades 40 of the fan 38. As briefly discussed above, pre-swirling the airflow 58 provided through the inlet 60 of the nacelle 50 prior to such airflow 58 reaching the plurality of fan blades 40 of the fan 38 may reduce separation losses and/or shock losses, allowing the fan 38 to operate with the relatively high fan tip speeds described above with less losses of in efficiency.

Figure 5:
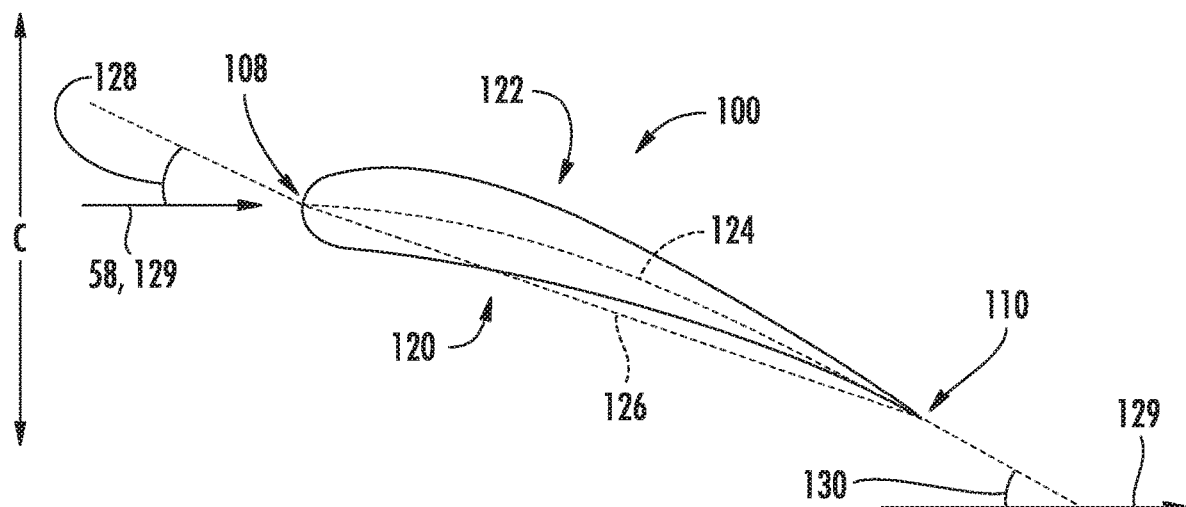
FIG. 5 is a cross-sectional view of a part span inlet guide vane of the exemplary gas turbine engine of FIG. 1 at a first location along a span of the part span inlet guide vane.

For example, referring first to FIG. 5, a cross-sectional view of one part span inlet guide vane 100 along the span of the part span inlet guide vanes 100, as indicated by Line 5-5 in FIG. 2, is provided. As is depicted, the part span inlet guide vane 100 is configured generally as an airfoil having a pressure side 120 and an opposite suction side 122, and extending between the leading edge 108 and the trailing edge 110 along a camber line 124. Additionally, the part span inlet guide vane 100 defines a chord line 126 extending directly from the leading edge 108 to the trailing edge 110. The chord line 126 defines an angle of attack 128 with an airflow direction 129 of the airflow 58 through the inlet 60 of the nacelle 50. Notably, for the embodiment depicted, the airflow direction 129 is substantially parallel to the axial direction A of the turbofan engine 10. For the embodiment depicted, the angle of attack 128 at the location depicted along the span 106 of the part span inlet guide vanes 100 is at least about five degrees and up to about thirty-five degrees. For example, in certain embodiments, the angle of attack 128 at the location depicted along the span 106 of the part span inlet guide vane 100 may be between about ten degrees and about thirty degrees, such as between about fifteen degrees and about twenty-five degrees.

Additionally, the part span inlet guide vane 100, at the location depicted along the span 106 of the part span inlet guide vane 100 defines a local swirl angle 130 at the trailing edge 110. The "swirl angle" at the trailing edge 110 of the part span inlet guide vane 100, as used herein, refers to an angle between the airflow direction 129 of the airflow 58 through the inlet 60 of the nacelle 50 and a reference line 132 defined by a trailing edge section of the pressure side 120 of the part span inlet guide vane 100. More specifically, the reference line 132 is defined by the aft twenty percent of the pressure side 120, as measured along the chord line 126. Notably, when the aft twenty percent the pressure side 120 defines a curve, the reference line 132 may be straight-line average fit of such curve e.g., using least mean squares).

Further, it will be appreciated, that a maximum swirl angle 130 refers to the highest swirl angle 130 along the span 106 of the part span inlet guide vane 100. For the embodiment depicted, the maximum swirl angle 130 is defined proximate the radially outer end 102 of the part span inlet guide vane 100 (e.g., at the outer ten percent of the span 106 of the part span inlet guide vanes 100), as is represented by the cross-section depicted in FIG. 5. For the embodiment depicted, the maximum swirl angle 130 of each part span inlet guide vane 100 at the trailing edge 110 is between five degrees and thirty-five degrees. For example, in certain exemplary embodiments, the maximum swirl angle 130 of each part span inlet guide vane 100 at the trailing edge 110 may be between about twelve degrees and twenty-five degrees.

Figure 6:
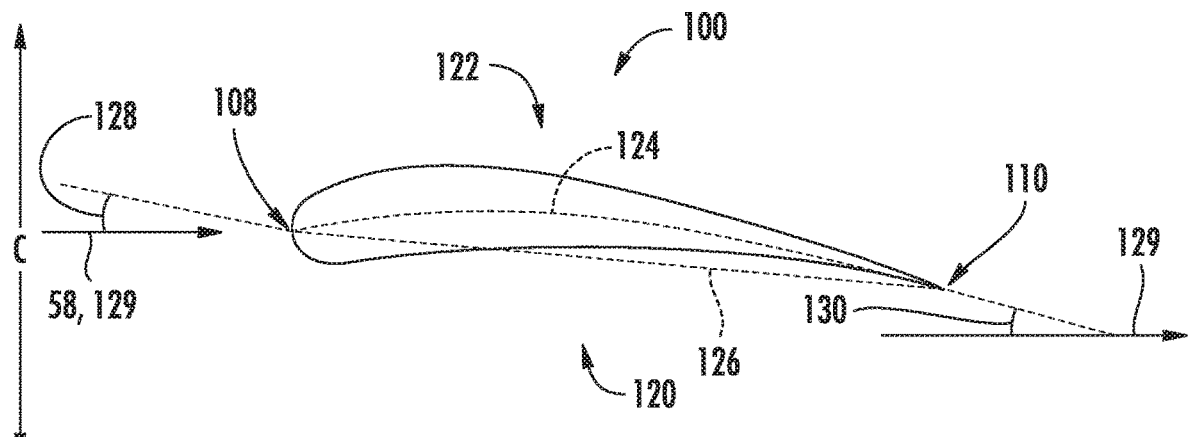
FIG. 6 is a cross-sectional view of the part span inlet guide vane of the exemplary gas turbine engine of FIG. 1 at a second location along the span of the part span inlet guide vane.

Moreover, it should be appreciated that for the embodiment of FIG. 2, the local swirl angle 130 increases from the radially inner end 104 to the radially outer end 102 of each part span inlet guide vane 100. For example, referring now also to FIG. 6, a cross-sectional view of a part span inlet guide vane 100 at a location radially inward from the cross-section viewed in FIG. 5, as indicated by Line 6-6 in FIG. 2, is provided. As is depicted in FIG. 6, and as stated above, the part span inlet guide vane 100 defines the pressure side 120, the suction side 122, the leading edge 108, the trailing edge 110, the camber line 124, and chord line 126. Further, the angle of attack 128 defined by the chord line 126 and the airflow direction 129 of the airflow 58 through the inlet 60 of the nacelle 50 at the location along the span 106 depicted in FIG. 6 is less than the angle of attack 128 at the location along the span 106 depicted in FIG. 5 (e.g., may be at least about twenty percent less, such as at least about fifty percent less, such as up to about one hundred percent less). Additionally, the part span inlet guide vane 100 defines a local swirl angle 130 at the trailing edge 110 at the location along the span 106 of the part span inlet guide vane 100 proximate the inner end 104, as depicted in FIG. 6. As stated above, the local swirl angle 130 increases from the radially inner end 104 to the radially outer end 102 of each part span inlet guide vanes 100. Accordingly, the local swirl angle 130 proximate the outer end 102 (see FIG. 5) is greater than the local swirl angle 130 proximate the radially inner end 104 (see FIG. 6; e.g., the radially inner ten percent of the span 106). For example, the local swirl angle 130 may approach zero degrees (e.g., may be less than about five degrees, such as less than about two degrees) at the radially inner end 104.

Notably, including part span inlet guide vanes 100 of such a configuration may reduce an amount of turbulence at the radially inner end 104 of each respective part span inlet guide vane 100. Additionally, such a configuration may provide a desired amount of pre-swirl at the radially outer ends of the plurality of fan blades 40 of the fan 38 (where the speed of the fan blades 40 is the greatest) to provide a desired reduction in flow separation and/or shock losses that may otherwise occur due to a relatively high speed of the plurality of fan blades 40 at the fan tips during operation of the turbofan engine 10.

Referring generally to FIGS. 2, 3, 5, and 6, it will be appreciated that for the embodiment depicted, the plurality of part span inlet guide vanes 100 further define a solidity. The solidity is defined generally as a ratio of a chord length (i.e., a length of the chord line 126) of each part span inlet guide vane 100 to a circumferential spacing 118 of the plurality of part span inlet guide vanes 100. More specifically, for the purposes of defining the solidity, the circumferential spacing 118 refers to the mean circumferential spacing 118 calculated using the following equation:

$$2 \times \pi \times r_m^2 \div n_b \quad \text{(Equation 1);}$$

wherein $r_m$ is the mean radius of the plurality of part span inlet guide vanes 100 and $n_b$ is the number of part span inlet guide vanes 100. The mean radius, $r_m$, may refer to a position halfway along the IGV span 106, relative to the longitudinal centerline 12 of the turbofan engine 10. Notably, for the purposes of calculating solidity, the chord length refers to the chord length at the mean radius, $r_m$. For the embodiment depicted, the solidity is between about 0.5 and is about 1.5. For example, in certain exemplary embodiments, the solidity of the part span inlet guide vanes 100 may be between about 0.7 and 1.2, such as between about 0.9 and about 1.0. Such a configuration may ensure desired amount of pre-swirl during operation of the turbofan engine 10.

Notably, the plurality of part span inlet guide vanes 100 depicted in FIGS. 1 through 6 are generally configured to pre-swirl a portion of an airflow through the inlet 60 of the outer nacelle 50 in a rotational direction that is the same as a rotational direction of the plurality of fan blades 40 of the fan 38. For example, for the exemplary embodiment of FIGS. 1 through 6, the plurality of fan blades 40 of the fan 38 are configured to rotate clockwise when viewed forward looking aft and the plurality of part-span inlet guide vanes 100 (and other pre-swirl features discussed herein) are configured to pre-swirl a portion of the airflow through the inlet 60 of the outer nacelle 50 in the same direction. However, in other exemplary embodiments the gas turbine engine may include a fan 38 with fan blades 40 configured to rotate counter-clockwise when viewed forward looking aft, in which case the plurality of part-span inlet guide vanes 100 (or other pre-swirl features discussed herein) may instead be mirrored such that they are configured to pre-swirl airflow in an opposite rotational direction than the direction depicted. Further, in still other exemplary embodiments, the plurality of part-span inlet guide vanes 100 (or other pre-swirl features discussed herein) may be configured to pre-swirl an airflow in an opposite rotational direction as the plurality of fan blades 40 of the fan 38.

Additionally, it should be appreciated that the exemplary part span inlet guide vanes 100 depicted in FIGS. 1 through 6 are provided by way of example only. In other exemplary embodiments, the plurality of part span inlet guide vanes 100 may have any other suitable configuration for providing a desired amount of pre-swirl upstream of a plurality of fan blades 40 of a fan 38 of a gas turbine engine. For example, referring generally to FIGS. 7 through 11, part span inlet guide vanes 100 in accordance with various other exemplary embodiments of the present disclosure are provided. Each of the exemplary turbofan engines 10 and exemplary part span inlet guide vanes 100 of FIGS. 7 through 11 may be configured in substantially the same manner as the exemplary turbofan engine 10 and part span inlet guide vanes 100 described above with reference to, e.g., FIGS. 1 and 2.

For example, the exemplary turbofan engines 10 of FIGS. 7 through 11 each generally include a turbomachine 16 and a fan section 14, and define an axial direction A, a radial direction R, and a circumferential direction C (i.e., a direction extending about the axial direction A; see, e.g., FIG. 3). The turbomachine 16, although not depicted, includes a turbine section having a drive turbine, or LP turbine 30 (see FIG. 1), mechanically coupled to a fan 38 of the fan section 14 through, for the embodiment depicted, an LP shaft 36. Additionally, the fan 38 includes a plurality of fan blades 40 rotatable about a longitudinal centerline 12 of the turbomachine 16. The plurality of fan blades 40 of the fan 38 are surrounded by, and enclosed by, an outer nacelle 50 of the turbofan engine 10, the outer nacelle 50 including an inner wall 52. In order to provide for a pre-swirling of an airflow 58 through an inlet 60 of the outer nacelle 50, the turbofan engine 10 further includes a plurality of part span inlet guide vanes 100. As stated, the exemplary part span inlet guide vanes 100 of FIGS. 7 through 11 are each configured in a similar manner to the exemplary part span inlet guide vanes 100 described above with reference to FIGS. 1 and 2. Accordingly, each of the plurality of part span inlet guide vanes 100 may be attached in a cantilevered fashion to the inner wall 52 of the outer nacelle 50 at a location forward of the plurality of fan blades 40 of the fan 38 of the turbofan engine 10 and aft of the inlet 60.

Figure 7:
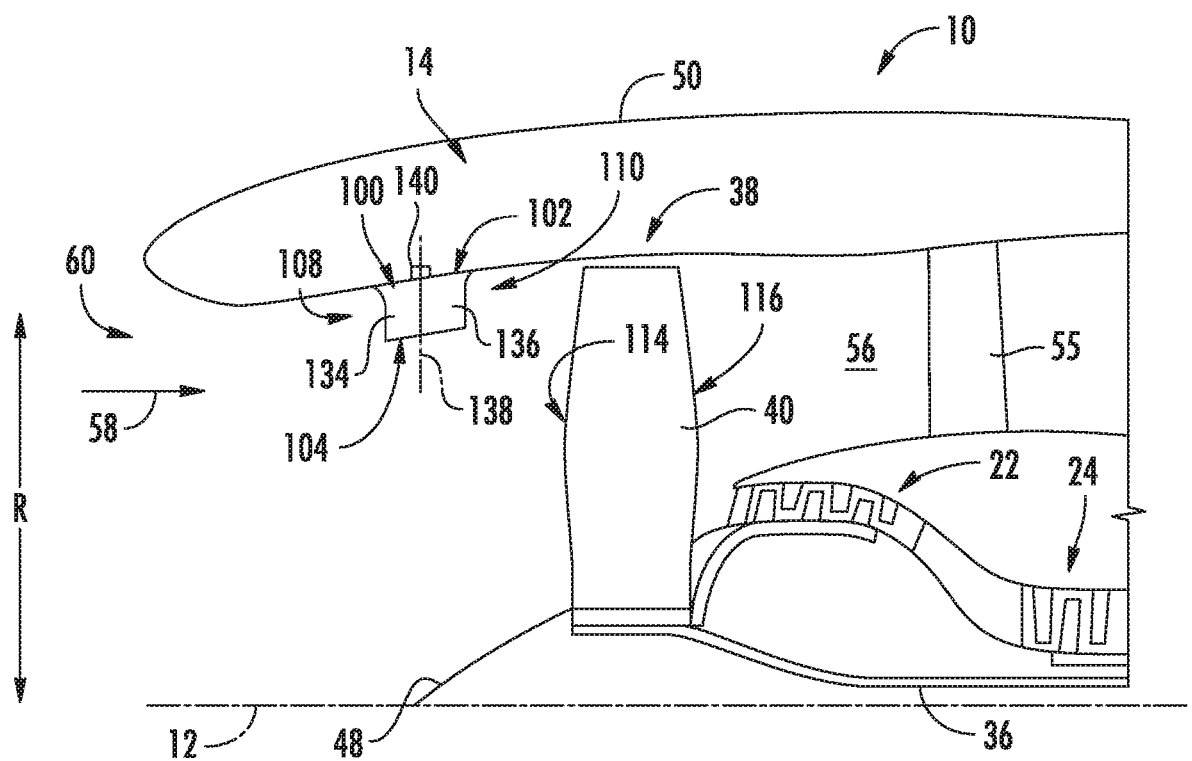
FIG. 7 is a close-up, schematic, cross-sectional view of a forward end of a gas turbine engine in accordance with another exemplary embodiment of the present disclosure.

However, referring particularly to FIG. 7, for the embodiment depicted, the plurality of part span inlet guide vanes 100 are further configured as variable part span inlet guide vanes. More specifically, each of the plurality of part span inlet guide vanes 100 depicted in FIG. 7 include a body portion 134 and a tail portion 136 (the tail portion 136 located aft of the body portion 134). Each of the body portion 134 and tail portion 136 extends substantially from a radially outer end 102 of the part span inlet guide vanes 100 to a radially inner end 104 of the part span inlet guide vanes 100. The body portion 134 may be substantially fixed, while the tail portion 136 may be configured to rotate about a longitudinal pivot axis 138 of the respective part span inlet guide vane 100 by a motor 140 or other pitch change mechanism. For the embodiment depicted, the longitudinal pivot axis 138 is substantially parallel to the radial direction R, however in other embodiments, the longitudinal pivot axis 138 may extend in any other suitable direction (e.g., may be "swept"; see FIG. 9). Rotation of the tail portion 136 of the part span inlet guide vanes 100 may effectively vary a swirl angle 130 of the respective part span inlet guide vane 100. Accordingly, with such an exemplary embodiment, the turbofan engine 10 may be configured to provide minimal pre-swirl during certain operating conditions, and provide maximum pre-swirl during other operating conditions. For example, in certain exemplary embodiments, the turbofan engine 10 may be configured to provide minimal pre-swirl when the fan 38 is rotating at a relatively slow rotational speed (such that the fan 38 defines a relatively low fan tip speed), and may further be configured to provide a maximum pre-swirl when the fan 38 is rotating at a relatively high rotational speed (such that the fan 38 defines a relatively high fan tip speed, such as during takeoff operating modes).

It should be appreciated, that the exemplary variable part span inlet guide vanes 100 depicted in FIG. 7 are provided by way of example only. In other exemplary embodiments, any other suitable variable part span inlet guide vanes 100 may be provided. For example, in other exemplary embodiments, the tail portion 136 may not extend along an entire span 106 of the part span inlet guide vanes 100, and instead may be limited to, e.g., a radially outer half, or other portion, of the part span inlet guide vanes 100. Additionally, any other suitable hardware may be provided for varying a swirl angle 130 of the variable part span inlet guide vanes 100. For example, in other embodiments, the tail portion 136 may not rotate about the longitudinal pivot axis 138, and instead may translate, e.g., forward and aft to modify the swirl angle 130. Other configurations are contemplated as well (e.g., pneumatic variable part span inlet guide vanes 100 using air to vary an effective swirl angle).

Figure 8:
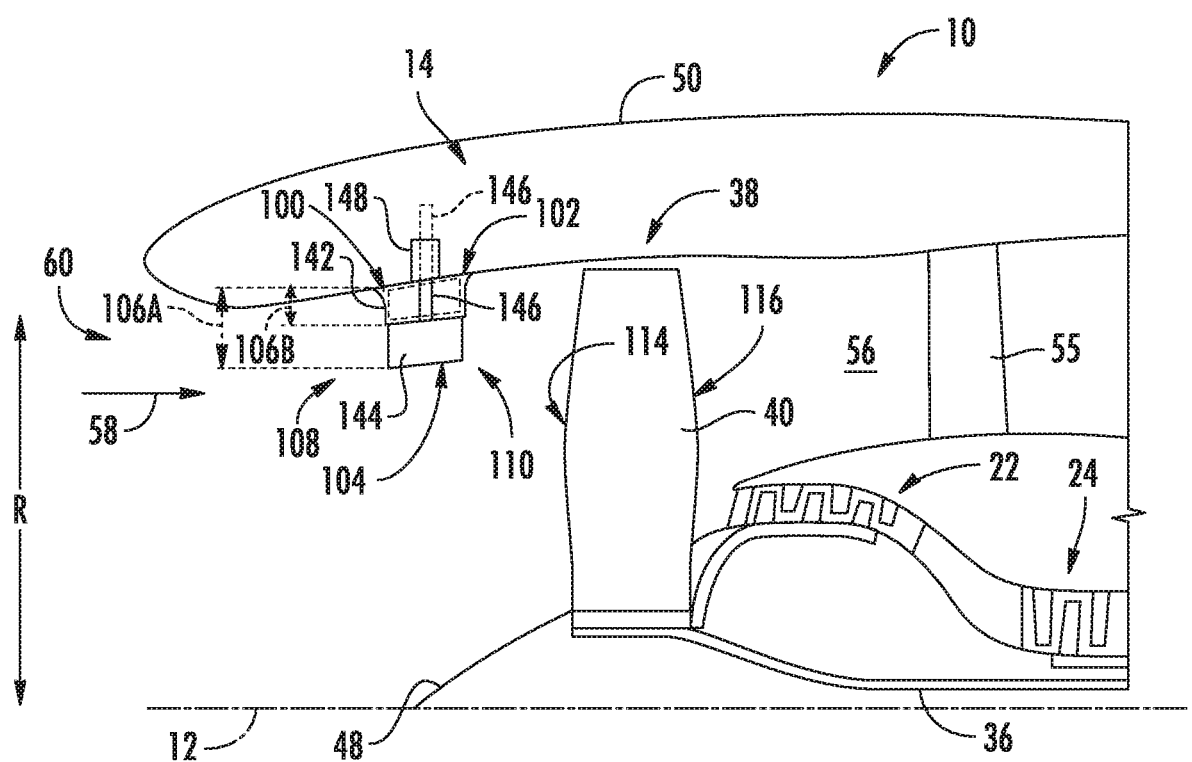
FIG. 8 is a close-up, schematic, cross-sectional view of a forward end of a gas turbine engine in accordance with yet another exemplary embodiment of the present disclosure.

Additionally, referring now particularly to FIG. 8, for the exemplary embodiment depicted, the exemplary part span inlet guide vanes 100 each define a variable span 106. More specifically, for the embodiment of FIG. 8, the inner end 104 of each of the plurality of part span inlet guide vanes 100 is movable generally along the radial direction R between an extended position (depicted) and a retracted position (depicted in phantom). For example, for the embodiment depicted each of the plurality of part span inlet guide vanes 100 defines a first span 106A when the extended position and a second span 106B when in the retracted position. The second span 106B may be between about twenty percent and about ninety percent of the first span 106A. For example, the second span 106B may be between about thirty percent and about eighty percent of the first span 106A, such as between about forty percent and about sixty percent of the first span 106A.

Referring still to FIG. 8, the exemplary part span inlet guide vane 100 is formed generally of a base portion 142 and an extendable portion 144. The extendable portion 144 is at least partially nested within the base portion 142 when the part span inlet guide vane 100 is in the retracted position (depicted in phantom), and more specifically is substantially completely nested within the base portion 142 when part span inlet guide vane 100 is in the retracted position. Additionally, as is depicted, the extendable portion 144 is positioned substantially outside the base portion 142 when the part span inlet guide vane 100 is in the extended position.

For the embodiment of FIG. 8, the extendable portion 144 is movable generally along the radial direction R by an extension rod 146 operable by a motor 148. However, in other embodiments, any other suitable assembly may be provided for moving part span inlet guide vane 100 between the extended position and the retracted position. Additionally, although the exemplary part span inlet guide vane 100 is depicted as including a single extendable portion 144, in other exemplary embodiments, one or more of the plurality of part span inlet guide vanes 100 may instead include a plurality of extendable portions 144 which may nest when moved to the retracted position (e.g., may include up to ten extendable portions 144). Further, other configurations for moving the radially inner end 104 generally along the radial direction R between an extended position and a retracted position are contemplated as well. For example, extendable portions 144 may fold or pivot to the "retracted" position.

Accordingly, with such an exemplary embodiment, the turbofan engine 10 may be configured to provide minimal pre-swirl during certain operating conditions (e.g., by moving the part span inlet guide vane 100 to the retracted position), and provide maximum pre-swirl during other operating conditions (e.g., by moving the part span inlet guide vane 100 to the extended position). For example, in certain exemplary embodiments, the turbofan engine 10 may be configured to provide minimal pre-swirl when the fan 38 is rotating at a relatively slow rotational speed (such that the fan 38 defines a relatively low fan tip speed), and may further be configured to provide a maximum pre-swirl when the fan 38 is rotating at a relatively high rotational speed (such that the fan 38 defines a relatively high fan tip speed, such as during takeoff operating modes).

Figure 9:
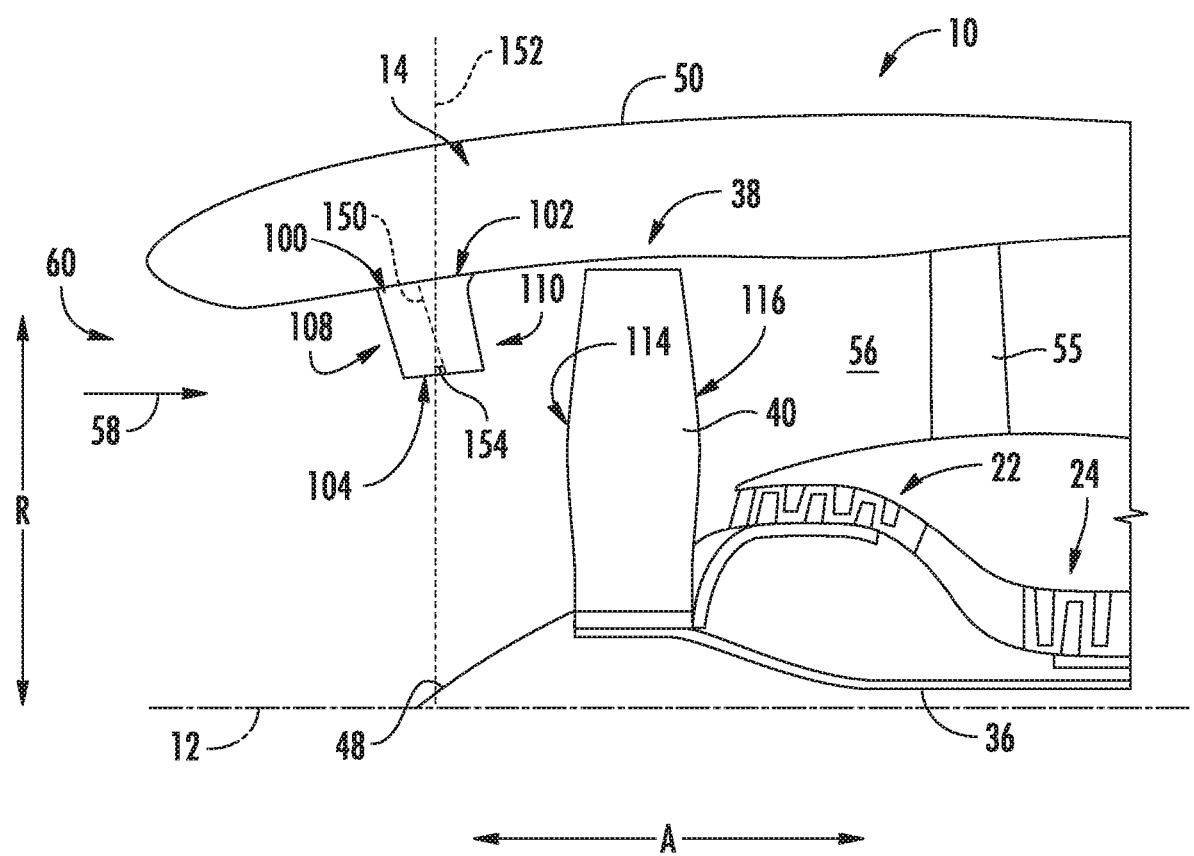
FIG. 9 is a close-up, schematic, cross-sectional view of a forward end of a gas turbine engine in accordance with still another exemplary embodiment of the present disclosure.

Referring now particularly to FIG. 9, for the exemplary embodiment depicted, the exemplary part span inlet guide vanes 100 are configured as "swept" part span inlet guide vanes. More specifically, as is depicted, the exemplary part span inlet guide vanes 100 each define a longitudinal axis 150 extending halfway between the leading edge 108 and a trailing edge 110 from the radially inner end 104 to the radially outer end 102. Additionally, the exemplary turbofan engine 10 defines a reference plane 152, or more specifically, the radial direction R and circumferential direction C the turbofan engine 10 together define a reference plane 152. The longitudinal axis 150 of each of the plurality of part span inlet guide vanes 100 intersects the reference plane 152 and defines a sweep angle 154 with the reference plane 152. For the embodiment depicted, the sweep angle 154 with the reference plane 152 is greater than about five degrees and up to about forty degrees. More specifically, for the embodiment depicted, the sweep angle 154 with the reference plane 152 is between about ten degrees and about thirty degrees, such as between about fifteen degrees and about twenty-five degrees. Inclusion of part span inlet guide vanes 100 defining a sweep angle 154 in accordance the embodiment of FIG. 9 may provide certain acoustic benefits and/or pre-swirl benefits during operation of the turbofan engine 10.

Notably, although for the embodiment depicted the exemplary part span inlet guide vanes 100 extend in a substantially straight direction from the radially inner end 104 to the radially outer end 102, in other embodiments one or more of the plurality of part span inlet guide vanes 100 may instead extend in a curved direction (i.e., a curved part-span inlet guide vane 100). With such a configuration, for the purposes of defining the sweep angle 154, the longitudinal axis 150 of such a part span inlet guide vane 100 may refer to a line extending between a point halfway between the leading edge 108 and trailing edge 110 at the radially outer end 102 of the part span inlet guide vane 100 to a point halfway between the leading edge 108 and the trailing edge 110 at the radially inner end 104 of the part span inlet guide vane 100.

Additionally, although for the embodiment depicted the plurality of part span inlet guide vanes 100 are configured with a forward-to-aft sweep, in other exemplary embodiments of the present disclosure, the plurality of part span inlet guide vanes 100 may instead define an aft-to-forward sweep (i.e., the sweep angle 154 may be negative).

Figure 10:
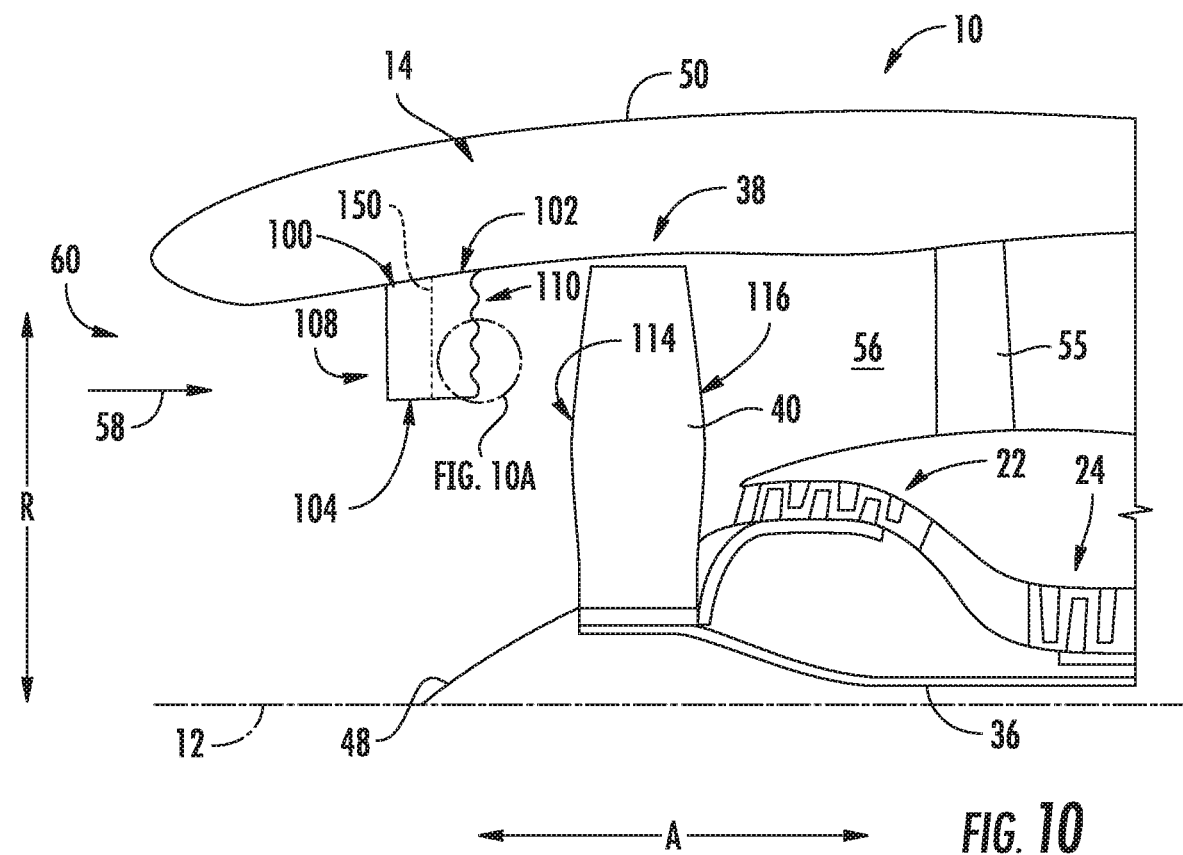
FIG. 10 is a close-up, schematic, cross-sectional view of a forward end of a gas turbine engine in accordance with yet another exemplary embodiment of the present disclosure.
Figure 10A:
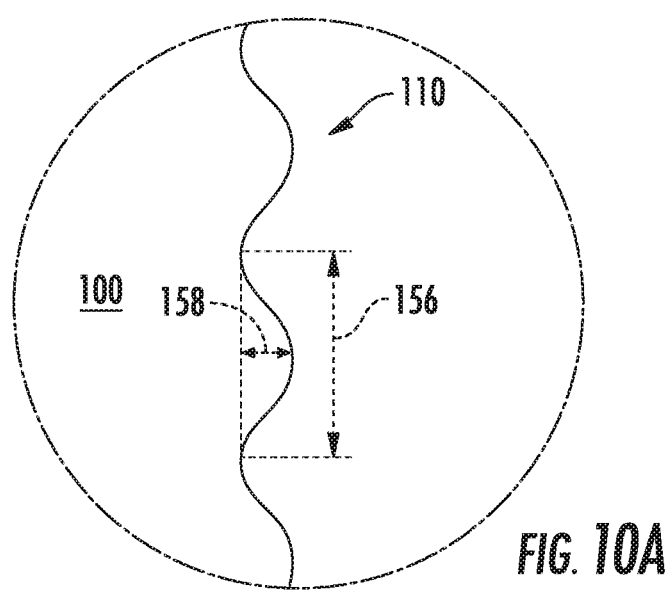
FIG. 10A is a close-up view of a trailing edge of a part span inlet guide vane in accordance with an exemplary embodiment of the present disclosure.

Referring now to FIG. 10, the exemplary part span inlet guide vanes 100 are configured to include a trailing edge 110 that is sculpted. More specifically, for the embodiment of FIG. 10, the trailing edge 110 of each of the plurality of part span inlet guide vanes 100 defines a non-linear sculpted shape. As used herein, the term "non-linear sculpted shape", with reference to a trailing edge 110, refers to any shape having sequential variations at the trailing edge 110 (i.e., sequential increases and decreases) in a local chord length and/or camber length (see. e.g., FIGS. 5 and 6, depicting cord line 126 in camber line 24) along the span 106 of the part span inlet guide vane 100. For example, referring particularly to Circle 10A in FIG. 10, providing a close-up view of a section of the trailing edge 110, the trailing edge 110 defines a periodic, sinusoidal wave shape. The wave shape of the trailing edge 110 defines a cycle distance 156 greater than about five percent of a span 106 of the part span inlet guide vane 100, and less than about thirty-three percent of the span 106 of the part span inlet guide vane 100. Accordingly, the wave shape repeats at least three times and up to about twenty times along the span 106 of the part span inlet guide vane 100. Additionally, the wave shape defines a height 158 (i.e., a peak-to-valley height) less than the cycle distance 156, such as between about five percent of the cycle distance 156 and about ninety percent of the cycle distance 156.

It should be appreciated, however, that in other embodiments, the plurality of part span inlet guide vanes 100 may have any other suitable sculpting at the trailing edge 110. For example, in other embodiments, the height 158 may be equal to, or greater than, the cycle distance 156, such as up to about five times greater than the cycle distance 156. Additionally, in other embodiments, the same shape may not repeat, and further, the sculpting shape may include any other suitable shape in addition to, or in the alternative to, waves. For example, the shape may include triangles, other polygons, semicircles, etc.

Inclusion of a plurality of part span guide vanes 100 having the trailing edge 110 in accordance with one or more of these embodiments may provide acoustic benefits to the turbofan engine 10 during operation of the turbofan engine 10 by, e.g., increasing a mixing of the wake of the part span inlet guide vanes 100 and a bulk airflow 58 through the inlet 60 of the nacelle 50.

Figure 11:
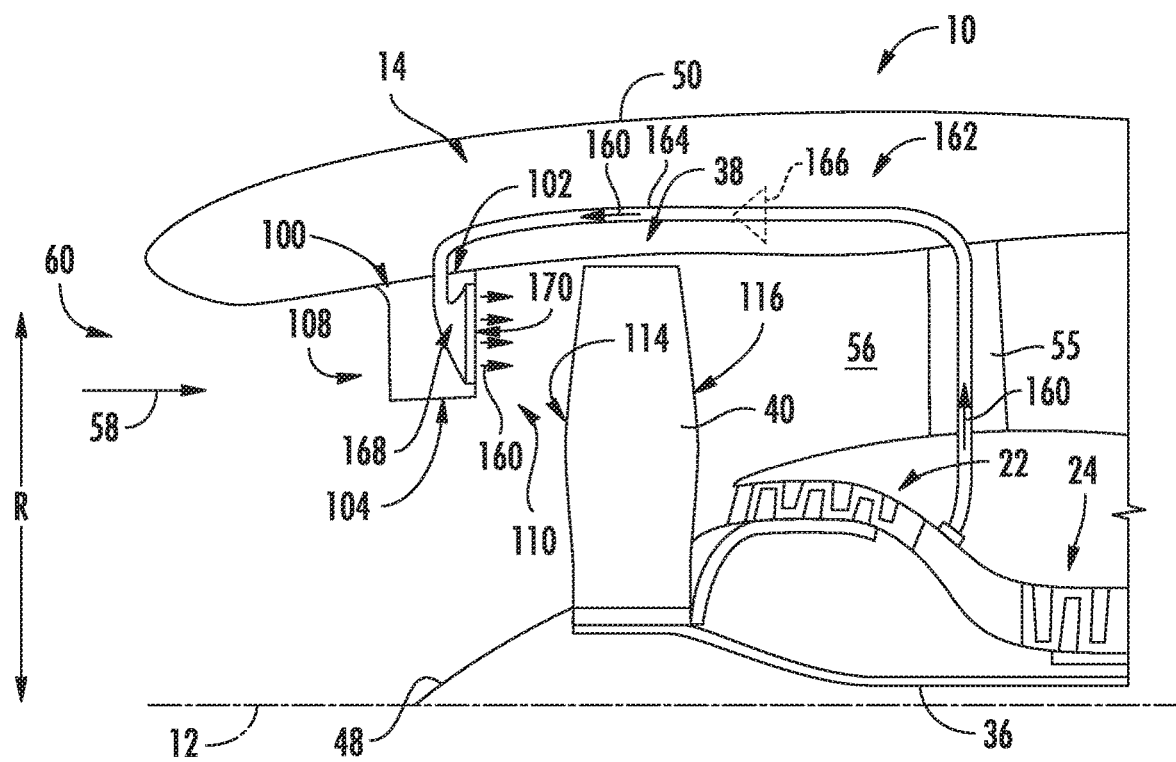
FIG. 11 is a close-up, schematic, cross-sectional view of a forward end of a gas turbine engine in accordance with still another exemplary embodiment of the present disclosure.

Referring now to FIG. 11, the plurality of part span inlet guide vanes 100 for the embodiment depicted are further configured to provide a compensation airflow 160 to a trailing edge 110 of the plurality of part span inlet guide vanes 100 to minimize a wake of the part span inlet guide vanes 100. More specifically, for the embodiment of FIG. 11, the turbofan engine 10 further includes a compensation air supply assembly 162 in airflow communication with a high pressure air source. The compensation air supply assembly 162 generally includes a compensation air supply duct 164 defining an inlet 166 in airflow communication with the high pressure air source, which for the embodiment depicted is the compressor section of the turbofan 10. For example, the compensation air supply duct 164 may be configured to receive bleed air from the compressor section of the turbofan engine 10. Notably, however, in other embodiments, the compensation air supply duct 164 may instead receive high pressure air from any other suitable high pressure air source. For example, in other exemplary embodiments, the high pressure air source may instead be the bypass airflow duct 56 at a location downstream of the plurality of fan blades 40 of the fan 38. Additionally, in one or more these embodiments, the compensation air supply assembly 162 may further include an air compressor 166 (depicted in phantom) configured to increase a pressure of the compensation airflow 160 through the compensation air supply duct 164. Notably, although the supply duct 164 is depicted as a single, continuous, and separate supply duct 164, in other embodiments, the composition air supply duct 164 may have any other suitable configuration. For example, the duct 164 may be formed of a plurality of sequential ducts, may be formed integrally with other components of the turbofan engine 10, and/or may be split off into a plurality of parallel airflow ducts to provide compensation airflow 160 to each of the plurality of part span inlet guide vanes 100 (similar to the distribution an extension air tubes 210, 212 of the embodiment of FIG. 21).

Further, the compensation air supply duct 164 extends through at least one of the plurality of part span inlet guide vanes 100, and provides a cavity 168 of the part span inlet guide vane 100 with the high pressure composition airflow 160. As is depicted, the each of the plurality of part span inlet guide vanes 100 for the embodiment depicted further defines a trailing edge opening 170, which is in airflow communication with the cavity 168, and thus is in airflow communication with the compensation air supply duct 164 of the compensation air supply assembly 162. Accordingly, with such a configuration, the high pressure composition airflow 160 may be provided from the compensation air supply assembly 162 to the cavity 168 of the part span inlet guide vane 100, and further through the trailing edge opening 170 of the part span inlet guide vane 100 during operation of the turbofan engine 10 to reduce a wake formed by the respective part span inlet guide vane 100.

It should be appreciated that although described as a "cavity" 168, in other embodiments the cavity 168 may be configured as any suitable opening or passage within the part span inlet guide vane 100 to allow a flow of air therethrough. Additionally, it should be appreciated that in other exemplary embodiments, the plurality of part span inlet guide vanes 100 may instead include any other suitable manner of pneumatically reducing the wake of the respective part span inlet guide vanes 100. For example, in other exemplary embodiments, the trailing edge opening 170 of each part span inlet guide vane 100 may instead be configured as, e.g., a plurality of trailing edge of openings spaced, e.g., along a span 106 of the respective part span inlet guide vane 100 at the trailing edge 110.

Figure 12:
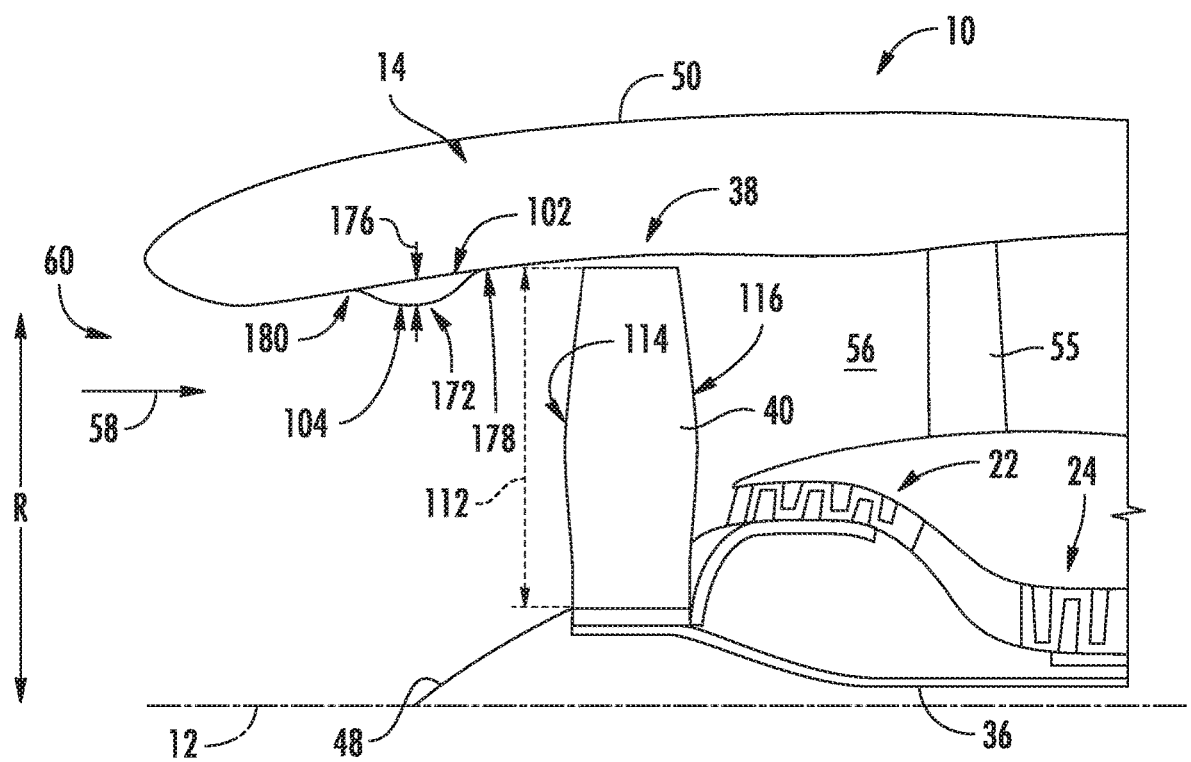
FIG. 12 is a close-up, schematic, cross-sectional view of a forward end of a gas turbine engine in accordance with yet another exemplary embodiment of the present disclosure.

It should further be appreciated that in still other embodiments of the present disclosure any other suitable inlet pre-swirl feature may be provided at a location upstream of the plurality of fan blades 40 of the fan 38 of the gas turbine engine and downstream of an inlet 60 of an outer nacelle 50. For example, referring now to FIG. 12, an inlet pre-swirl feature of a gas turbine engine in accordance with another exemplary embodiment of the present disclosure is provided. More specifically, FIG. 12 depicts a turbofan engine 10 in accordance with an embodiment of the present disclosure, configured in substantially the same manner as the exemplary turbofan engine 10 described above with reference to FIGS. 1 and 2. Accordingly, the exemplary turbofan engine 10 of FIG. 12 generally includes a turbomachine 16 and a fan section 14. The turbomachine 16, although not depicted, includes a turbine section having a drive turbine, or LP turbine 30 (see FIG. 1), mechanically coupled to a fan 38 of the fan section 14 through, for the embodiment depicted, an LP shaft 36. Additionally, the fan 38 includes a plurality of fan blades 40 rotatable about a longitudinal centerline 12 of the turbomachine 16. The plurality of fan blades 40 of the fan 38 are surrounded by, and enclosed by, an outer nacelle 50 of the turbofan engine 10, the outer nacelle 50 including an inner wall 52. Further, the exemplary turbofan engine 10 includes an inlet pre-swirl feature attached to or integrated with the inner wall 52 of the outer nacelle 50 at a location forward of the plurality of fan blades 40 of the fan 38.

Figure 13:
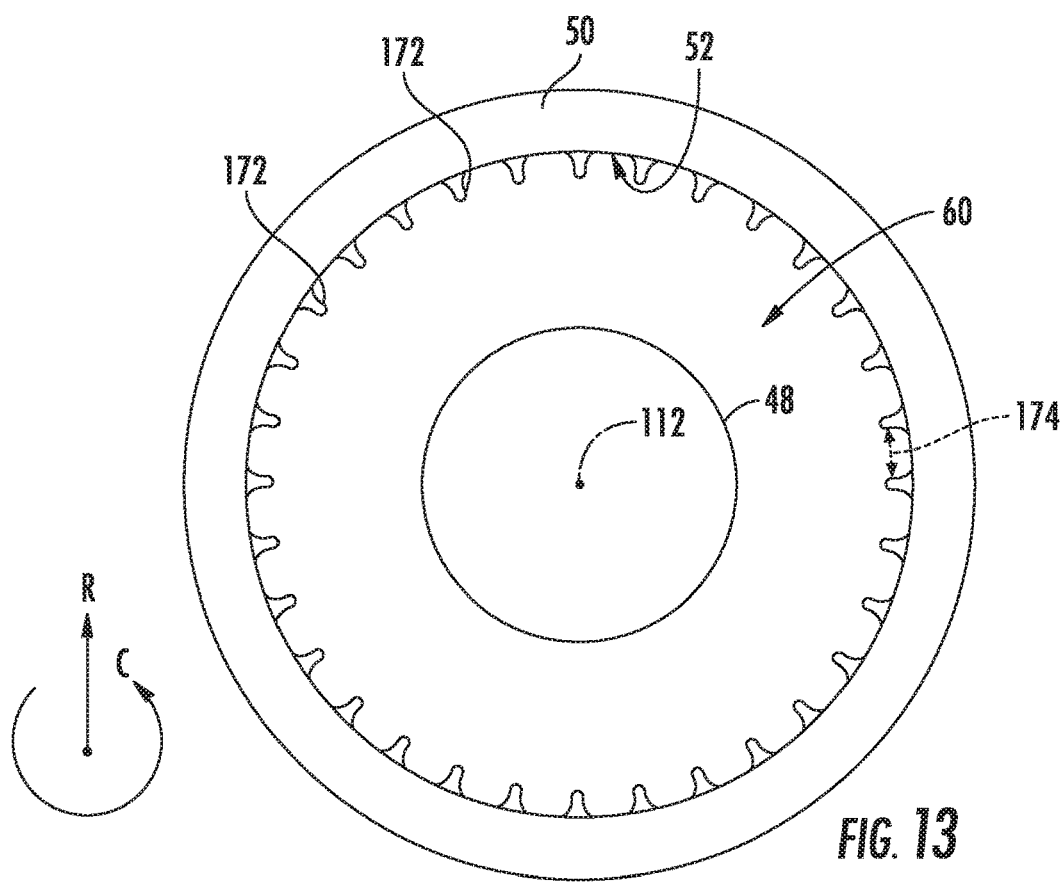
FIG. 13 is a schematic view of an inlet to the exemplary gas turbine engine of FIG. 12, along an axial direction of the gas turbine engine of FIG. 12.

However, for the embodiment of FIG. 12, the inlet pre-swirl feature does not include a plurality of part span inlet guide vanes 100, and instead is configured as a plurality of pre-swirl contours 172 positioned forward of the fan blades 40 of the fan 38 along the axial direction A and extending inwardly along the radial direction R. Each of the plurality of pre-swirl contours 172 may be spaced along the circumferential direction C of the turbofan engine 10. For example, referring now also to FIG. 13, providing a schematic, axial view of the inlet 60 to the turbofan engine 10, each of the plurality of pre-swirl contours 172 are spaced substantially evenly along the circumferential direction C, such that each adjacent pre-swirl contour 172 defines a substantially uniform circumferential spacing 174. Additionally, it should be appreciated that the exemplary turbofan engine 10 may include any suitable number of pre-swirl contours 172. For example, in certain exemplary embodiments the plurality of pre-swirl contours 172 includes between about five pre-swirl contours 172 and about eighty pre-swirl contours 172, such as between about thirty pre-swirl contours 172 and about fifty pre-swirl contours 172, and more specifically, for the embodiment depicted, includes thirty-two pre-swirl contours 172.

Figure 14:
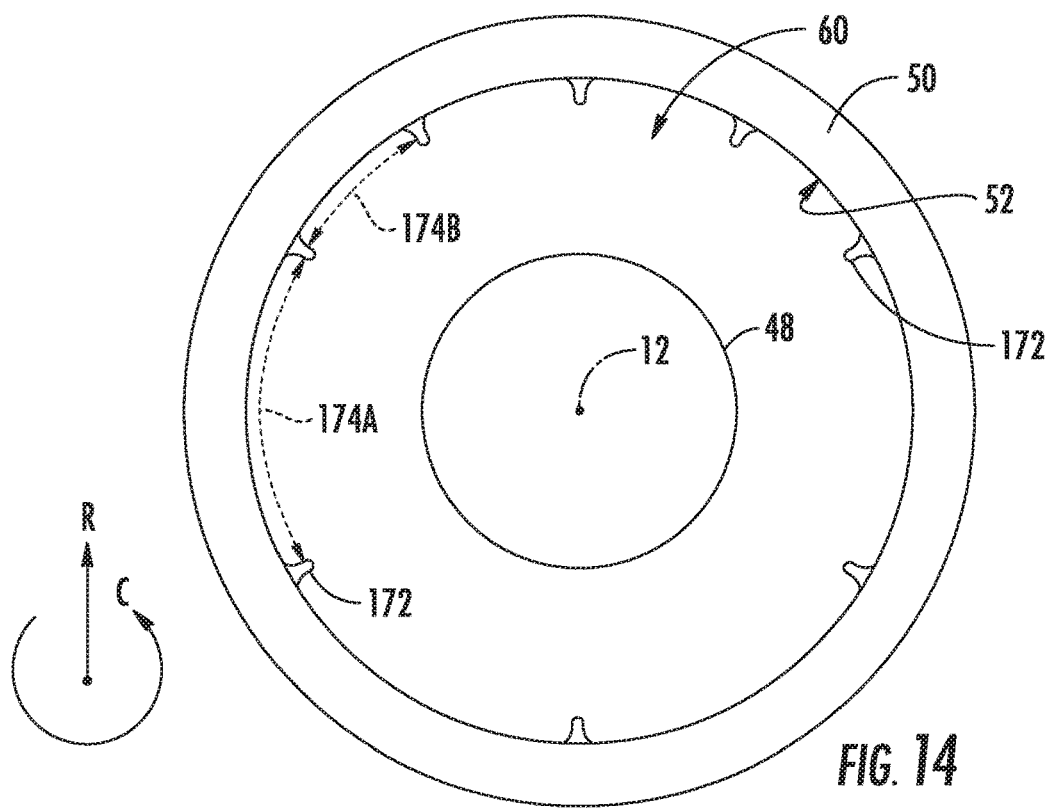
FIG. 14 it is a schematic view of an inlet to a gas turbine engine in accordance with another exemplary embodiment of the present disclosure.

However, in other exemplary embodiments, the plurality of pre-swirl contours 172 may have any other suitable spacing. For example, referring briefly to FIG. 14, providing a schematic, axial view of an inlet 60 of a turbofan engine 10 in accordance with another exemplary embodiment of the present disclosure, the plurality of pre-swirl contours 172 may define a non-uniform circumferential spacing 174. For example, at least certain of the plurality of pre-swirl contours 172 define a first circumferential spacing 174A, while other of the plurality of pre-swirl contours 172 define a second circumferential spacing 174B. For the embodiment depicted, the first circumferential spacing 174A is at least about twenty percent greater than the second circumferential spacing 174B, such as at least about twenty-five percent greater such as at least about thirty percent greater, such as up to about two hundred percent greater. The circumferential spacing 174 refers to a mean circumferential spacing between adjacent pre-swirl contours 172.

Referring now also to FIGS. 15 through 18, various other views of one or more of the plurality pre-swirl contours 172 of FIG. 12 are provided. More specifically, FIG. 15 provides a perspective view of the exemplary pre-swirl contour 172 of FIG. 12; FIG. 16 provides a side view of the exemplary pre-swirl contours 172 are of FIG. 12; FIG. 17 provides a cross-sectional view of a plurality of pre-swirl contours 172, including the exemplary pre-swirl contour 172 of FIG. 12; and FIG. 18 provides a top view of a plurality of pre-swirl contours 172, including the exemplary pre-swirl contour 172 FIG. 12.

Referring first particularly to FIG. 15, it will be appreciated that for the embodiment depicted, the plurality of pre-swirl contours 172 are formed integrally with the inner wall 52 of the outer nacelle 50 to form a monolithic component. For example, the inner wall 52 of the outer nacelle 50 may be formed by casting to include the plurality of pre-swirl contours 172, or alternatively the inner wall 52 of the outer nacelle 50 may be stamped to include the plurality of pre-swirl contours 172, or alternatively, still, the inner wall 52 of the outer nacelle 50 may be formed using a suitable additive manufacturing technique. However, it should be appreciated that in other exemplary embodiments the plurality of pre-swirl contours 172 may instead be formed separately from the inner wall 52 and attached to the inner wall 52 of the outer nacelle 50 (or some other component of the outer nacelle 50) in any other suitable manner.

Referring particularly to FIGS. 16 and 17, it will be appreciated that each of the plurality of pre-swirl contours 172 defines a height 176 along the radial direction R, and further extends generally from an aft end 178 to a forward end 180. Additionally, for the exemplary embodiment depicted, the pre-swirl contours 172 each define an arcuate shape along the axial direction A, extending from the forward end 180 to the aft end 178. Accordingly, the height 176 of the pre-swirl contour 172 varies along a length thereof. More particularly, at the forward ends 180 of the pre-swirl contours 172, the height 176 of each respective pre-swirl contour 172 is approximately equal to zero (e.g., less than five percent of a maximum height 176), and similarly at the aft ends 178 of the pre-swirl contours 172 the height 176 of each respective pre-swirl contours 172 is approximately equal to zero (e.g., less than five percent of a maximum height 176).

Moreover, referring now also particularly to FIG. 18, each of the plurality pre-swirl contours 172 further defines a ridge line 182, each ridge line 182 tracking a peak height 176 of the respective pre-swirl contour 172 between the forward and aft ends 180, 178 of the respective pre-swirl contour 172. A maximum height 176 of each of the plurality of pre-swirl contours 172 for the embodiment depicted is located within a middle seventy-five percent of the respective ridge line 182, as measured along a total length of the respective ridge line 182. More specifically, for the embodiment depicted, the maximum height 176 of each of the plurality of pre-swirl contours 172 is located within a middle fifty percent of the respective ridge line 182.

Additionally, the maximum height 176 of each of the plurality of pre-swirl contours 172 may be sufficient to provide a desired amount of pre-swirl to an airflow 58 received through an inlet 60 of the outer nacelle 50 (see FIG.

12). For example, in certain exemplary embodiments, the maximum height 176 of each of the plurality of pre-swirl contours 172 may be between about two percent and about forty percent of a fan blade span 112 of a fan blade 40 of the fan 38 (see FIG. 12). For example, in certain exemplary embodiments, the maximum height 176 of each of the plurality of pre-swirl contours 172 may be between about five percent and about thirty percent of a fan blade span 112 of a fan blade 40, such as between about ten percent and about twenty-five percent of a fan blade span 112 of a fan blade 40.

Further, the plurality of pre-swirl contours 172 define a swirl angle 184. With reference to the pre-swirl contours 172, the swirl angle 184 refers to an angle of the ridge line 182 relative to an airflow direction 129 of the airflow 58 through the inlet 60 of the nacelle 50 during operation of the turbofan engine 10, which may be parallel to the axial direction A of the turbofan engine 10. Referring particularly to FIG. 18, a maximum swirl angle 184 is defined by the aft twenty-five percent of the ridge line 182. Additionally, for the embodiment depicted, the maximum swirl angle 184 of each of the plurality of contours 172 is between about five degrees and about forty degrees. For example, the maximum swirl angle 184 of each of the plurality of contours 172 may be between about ten degrees and about thirty degrees, such as between about fifteen degrees and about twenty-five degrees. Notably, although the aft twenty-five percent of the ridge line 182 for the embodiment depicted is substantially straight, in other exemplary embodiments, it may define a curve. In such embodiments, the maximum swirl angle 184 may be defined with a reference line equal to an average of the aft twenty-five percent of the ridge line 182. The average of the aft twenty-five percent of the ridge line 182 may be found using, e.g., least mean squares or suitable method.

It will be appreciated, however, that the exemplary pre-swirl contours 172 described herein with reference to FIGS. 12 through 18 are provided by way of example only. In other exemplary embodiments, the plurality of pre-swirl contours 172 may have any other suitable shape and/or configuration. For example, in other exemplary embodiments, one or more of the plurality of pre-swirl contours 172 may not define an arcuate shape, and may, for example, define a height 176 greater than zero at one or both of the forward end 180 and aft end 178. Additionally, in other exemplary embodiments, the plurality of pre-swirl contours 172 may not each define substantially the same shape. For example, in other exemplary embodiments, one or more the plurality of pre-contours 172 may define a maximum height 176 greater than an adjacent pre-swirl contour 172.

Additionally, it will be appreciated that inclusion of one or more of the plurality of pre-swirl contours 172 in accordance with an exemplary embodiment of the present disclosure may provide for an increased efficiency of the turbofan engine 10 when operating with, e.g., relatively high fan tip speeds. For example, the plurality of pre-swirl contours 172 may provide an amount of pre-swirl to an airflow 58 through an inlet 60 of a nacelle 50 of the turbofan engine 10, such that the airflow 58 at the radially outer ends of the fan blades 40 of the fan 38 is less susceptible to separation from the plurality of fan blades 40 and/or shock losses.

Figure 19:
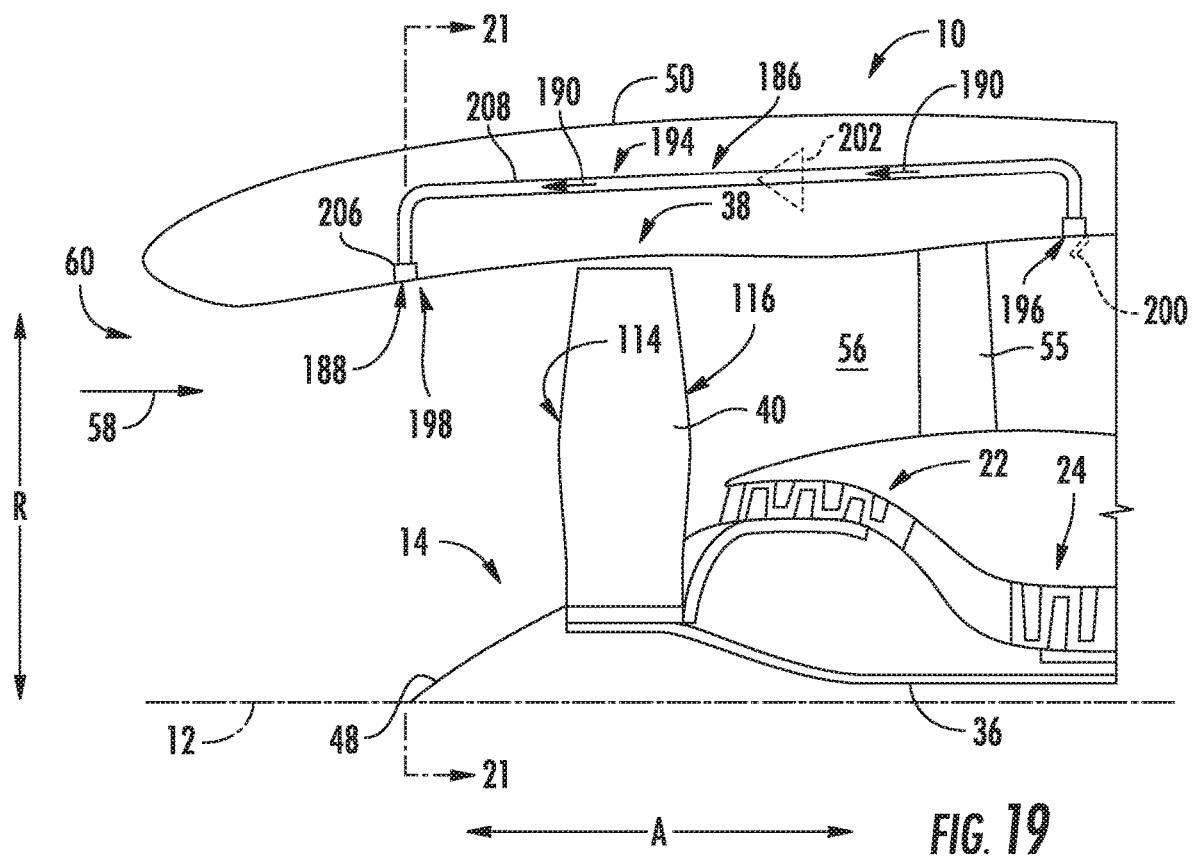
FIG. 19 is a close-up, schematic, cross-sectional view of a forward end of a gas turbine engine in accordance with still another exemplary embodiment of the present disclosure.

It should further be appreciated that in still other embodiments of the present disclosure any other suitable inlet pre-swirl feature may be provided located upstream of the plurality of fan blades 40 of the fan 38 of the gas turbine engine. For example, referring now to FIG. 19, an inlet pre-swirl feature in accordance with yet another exemplary embodiment of the present disclosure is provided. More specifically, FIG. 19 depicts a turbofan engine 10 in accordance with an embodiment of the present disclosure, configured in substantially the same manner as the exemplary turbofan engine 10 described above with reference to FIGS. 1 and 2. Accordingly, the exemplary turbofan engine 10 of FIG. 19 generally includes a turbomachine 16 and a fan section 14. The turbomachine 16 includes a compressor section and, although not depicted, a turbine section having a drive turbine, or LP turbine 30 (see FIG. 1), mechanically coupled to a fan 38 of the fan section 14 through, for the embodiment depicted, an LP shaft 36. Additionally, the fan 38 includes a plurality of fan blades 40 rotatable about a longitudinal centerline 12 of the turbomachine 16. The plurality of fan blades 40 of the fan 38 are surrounded by, and enclosed by, an outer nacelle 50 of the turbofan engine 10, the outer nacelle 50 including an inner wall 52. Downstream of the fan 38 of the fan section 14, the outer nacelle 50 defines a bypass airflow passage 56 with the turbomachine 16. Further, the exemplary turbofan engine 10 includes an inlet pre-swirl feature attached to or integrated with the inner wall 52 of the outer nacelle 50 at a location forward of the plurality of fan blades 40 of the fan 38.

However, for the embodiment of FIG. 19, the inlet pre-swirl feature does not include a plurality of part span inlet guide vanes 100, and instead is configured as an airflow delivery system 186. More specifically, for the embodiment of FIG. 19 the inner wall 52 of the outer nacelle 50 defines a plurality of openings 188 located forward of the plurality of fan blades 40 of the fan 38 along the axial direction A. The inlet pre-swirl feature includes these plurality of openings 188, with the plurality of openings 188 configured to provide a swirl airflow 190 upstream of the plurality of fan blades 40 of the fan 38 at a swirl angle 192 greater than zero relative to the radial direction R of the turbofan engine 10 (and more specifically relative to a local reference plane defined by the axial direction A and the radial direction R). As is depicted, for the embodiment of FIG. 19 the airflow delivery system 186 generally includes an air tube 194 extending between an inlet 196 and an outlet 198. As will be discussed in greater detail below, the outlet 198 of the air tube 194 is in airflow communication with the plurality of openings 188 defined by the inner wall 52 of the outer nacelle 50. Additionally, the inlet 196 of the air tube 194 is in airflow communication with a high pressure air source for receiving the swirl airflow 190. For the embodiment depicted, the high pressure air source is the bypass airflow passage 56 at a location downstream of the plurality of fan blades 40 the fan 38.

As is depicted in phantom, in certain embodiments, the airflow delivery system 186 may further include a door 200 (i.e., a door, scoop, or other structural component) to scoop air into the inlet 196 of the air tube 194. The door 200 may be movable between an open position and closed position depending on, e.g., an operating condition of the gas turbine engine. For example, the door 200 may move to the open position when it is desirable to provide pre-swirling of an airflow 58 through the inlet 60 of the outer nacelle 50. As is also depicted in phantom, the airflow delivery system 186 may further include an air compressor 202, the air compressor 202 in airflow communication with the air tube 194. The air compressor 202 may act to increase a pressure of the swirl airflow 190 through the air tube 194 to increase an amount of, e.g., pre-swirl provided by the inlet pre-swirl feature depicted.

Figure 20:
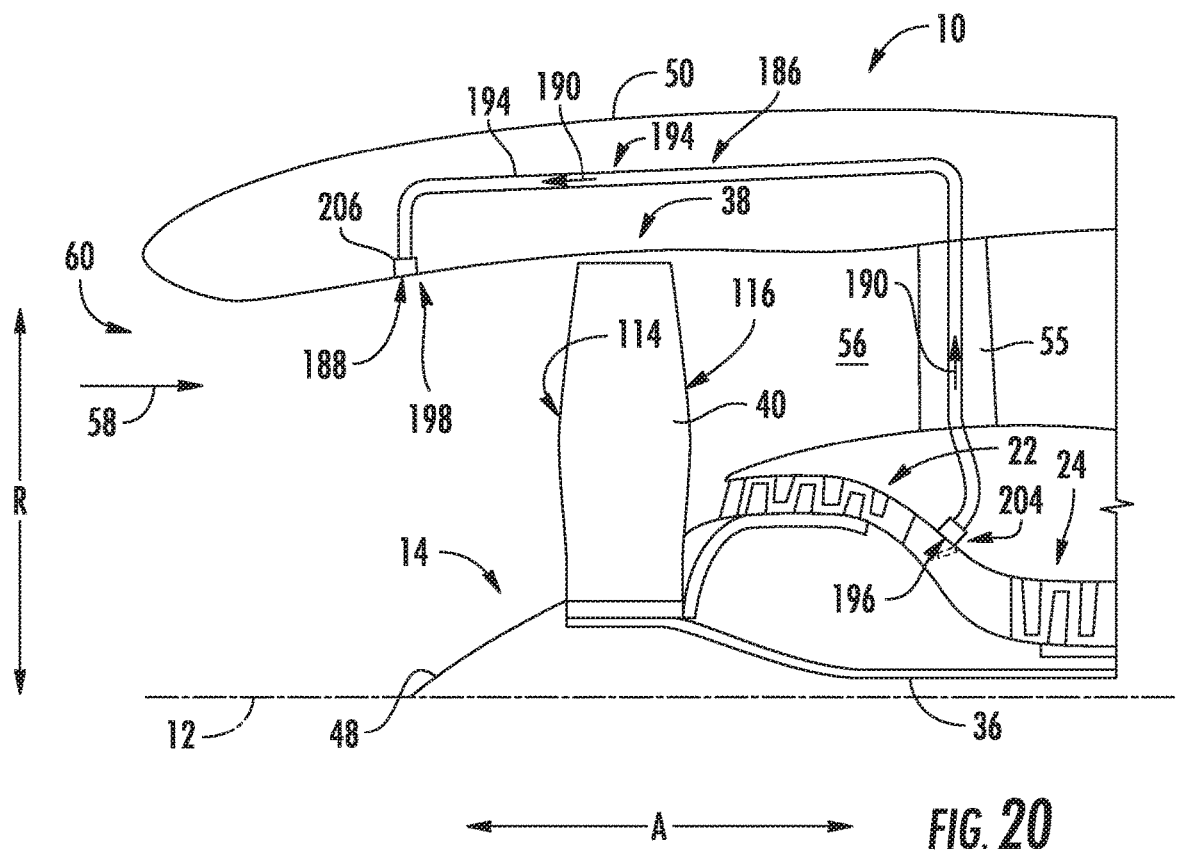
FIG. 20 is a close-up, schematic, cross-sectional view of a forward end of a gas turbine engine in accordance with yet another exemplary embodiment of the present disclosure.

Notably, however, in other exemplary embodiments any other suitable high pressure air source may be provided. For example, referring now to FIG. 20, a cross-sectional view of a gas turbine engine in accordance with another exemplary embodiment of the present disclosure is provided. The exemplary gas turbine engine of FIG. 20 is configured in substantially the same manner as the exemplary turbofan engine 10 described above with reference to FIG. 19. However, for the embodiment of FIG. 20, the air tube 194 of the airflow delivery system 186 is in airflow communication with a different high pressure air source. More specifically, for the embodiment of FIG. 20, the high pressure air source is a compressor of the compressor section of the turbomachine 16. More specifically, still, for the embodiment of FIG. 20, the high pressure air source is a compressor bleed valve 204 of the compressor section of the turbofan engine 10. However, in still other exemplary embodiments, any other suitable high pressure air source may be provided.

Figure 21:
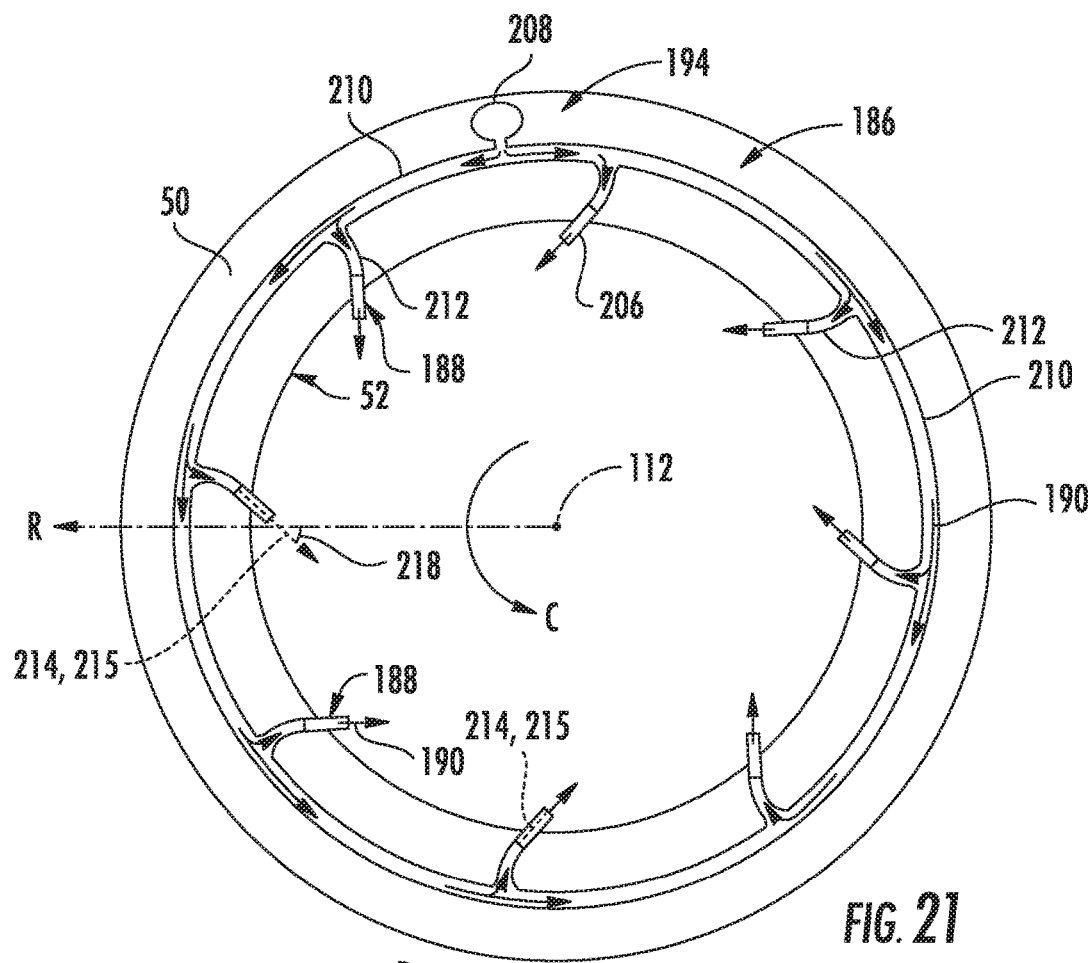
FIG. 21 is a schematic, cross-sectional view of an outer nacelle of the exemplary gas turbine engine of FIG. 19, as viewed along Line 21-21 of FIG. 19.

Referring back to FIG. 19, the turbofan engine 10, or rather the airflow delivery system 186 of the turbofan engine 10, further includes a plurality of airflow nozzles 206, with each airflow nozzle 206 positioned at one of the openings 188 defined by the inner wall 52 of the nacelle 50. Referring now also to FIG. 21, a cross-sectional view of a section of the outer nacelle 50 defining the openings 188 and including the airflow nozzles 206 is provided along Line 21-21 of FIG. 19. As is depicted, the air tube 194 of the airflow delivery system 186 further includes a plurality of segments. For example, in the embodiment depicted, the air tube 194 includes a supply air tube 208 in airflow communication with the inlet 196 for receiving the swirl airflow 190 from the high pressure air source. Additionally, the air tube 194 includes a distribution air tube 210 extending from the supply air tube 208 and, for the embodiment depicted, in the circumferential direction C substantially three hundred sixty degrees within the outer nacelle 50. Further, the air tube 194 includes a plurality of extension air tubes 212 extending between the distribution air tube 210 and the plurality of airflow nozzles 206, with each of the extension air tubes 212 defining a respective outlet 198 of the air tube 194. Accordingly, with such an embodiment, the air tube 194 further defines a plurality of outlets 198.

As is depicted, the airflow nozzles 206 each define an airflow direction 214, the airflow direction 214 being the direction in which the swirl airflow 190 is provided through the openings 188 of the inner wall 52 of the outer nacelle 50. In certain exemplary embodiments, the airflow direction 214 of each of the respective airflow nozzles 206 may extend along a centerline 215 of each of the respective airflow nozzles 206. Additionally, for the embodiment depicted the airflow direction 214 defines the swirl angle 192. Accordingly, for the embodiment depicted, the swirl angle 192 may refer to an angle between the airflow direction 214 of the plurality of airflow nozzles 206 and the radial direction R of the turbofan engine 10, or more specifically, for the embodiment depicted, the swirl angle 192 refers to an angle between the airflow direction 214 and a reference plane defined by the radial direction R and the axial direction A of the turbofan engine 10. In certain exemplary embodiments, the swirl angle 192 is between five degrees and thirty-five degrees. For example, in certain embodiments the swirl angle 192 may be between ten degrees and thirty degrees, such as between fifteen degrees and twenty-five degrees.

Further, the plurality of airflow nozzles 206 may include any suitable number of airflow nozzles 206, such as between about five airflow nozzles 206 and about one hundred airflow nozzles 206. More specifically, for the embodiment depicted, the plurality of airflow nozzles 206 includes eight airflow nozzles 206. However, in other embodiments, the turbofan engine 10 of FIG. 21 may include the same number of airflow nozzles 206 as, e.g., the exemplary turbofan engine 10 described above with reference to FIGS. 1 through 3 includes part span inlet guide vanes 100. For example, in certain exemplary embodiments, the turbofan engine 10 may include at least twenty airflow nozzles 206, such as at least thirty airflow nozzles 206, and up to about fifty airflow nozzles 206, such as up to about forty-five airflow nozzles 206.

Figure 22:
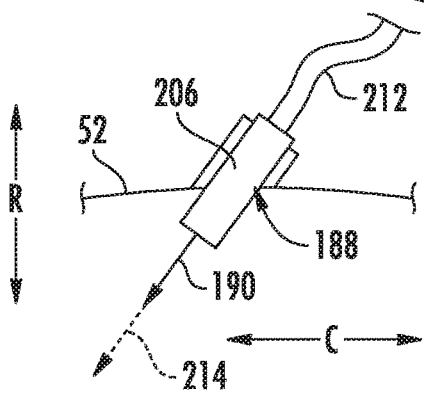
FIG. 22 is a close-up view of an airflow nozzle of the exemplary turbine engine of FIG. 21.
Figure 23:
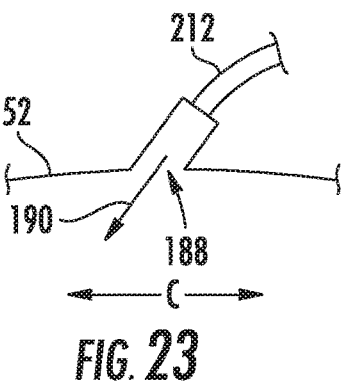
FIG. 23 is a close-up view of an airflow nozzle in accordance with another exemplary embodiment of the present disclosure.
Figure 24:
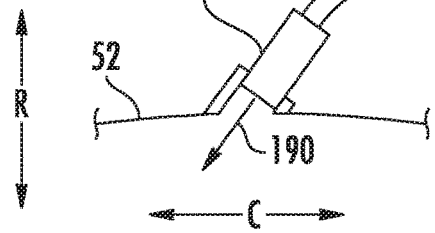
FIG. 24 is a close-up view of an airflow nozzle in accordance with yet another exemplary embodiment of the present disclosure.

Referring now briefly to FIG. 22, providing a close-up view of one of the exemplary airflow nozzles 206, it will be appreciated that for the embodiment depicted, the plurality of airflow nozzles 206 are formed separately from the inner wall 52 of the outer nacelle 50 and attached to the inner wall 52 of the outer nacelle 50. Additionally, for the embodiment depicted, the plurality of airflow nozzles 206 each extend through a respective opening 188 in the inner wall 52 of the outer nacelle 50. It should be appreciated, however, that in other exemplary embodiments, any other suitable configuration of airflow nozzles 206 may be provided. For example, referring briefly to FIG. 23, in other exemplary embodiments, one or more of the plurality of airflow nozzles 206 may be formed integrally with the inner wall 52 of the outer nacelle 50 (e.g., by casting, stamping, additive manufacturing, etc.), and further, referring now briefly to FIG. 24, in other exemplary embodiments, one or more of the plurality of airflow nozzles 206 may not extend through the opening 188 of the inner wall 52 of the outer nacelle 50. Moreover, in still other exemplary embodiments, one or more of the plurality of airflow nozzles 206 may be flush with the opening 188 defined in the inner wall 52 the outer nacelle 50, or alternatively, the turbofan engine 10, and more specifically, the airflow delivery system 186, may not include airflow nozzles 206 altogether.

Figure 25:
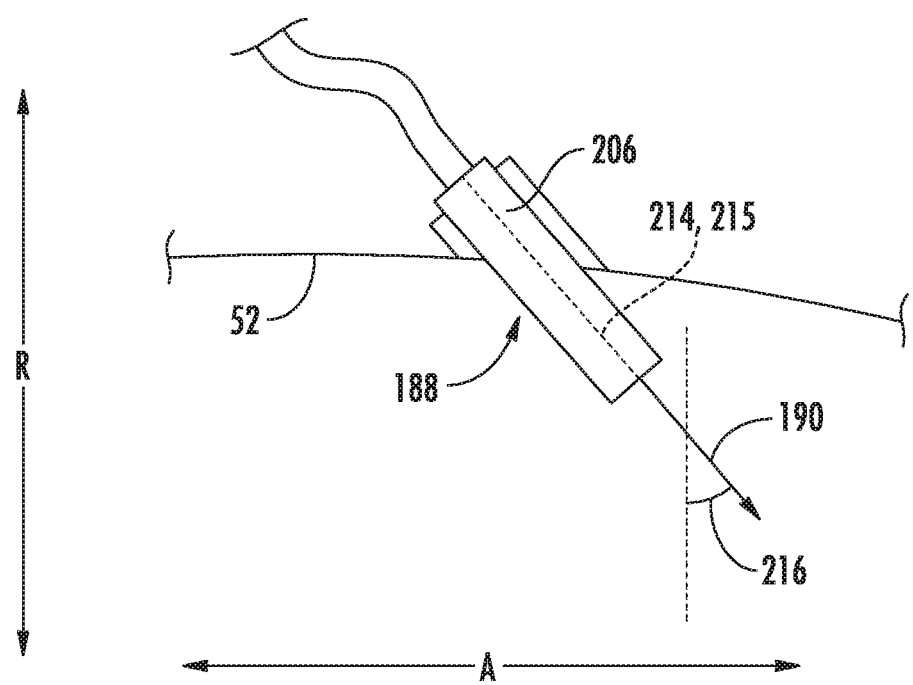
FIG. 25 is a close-up, cross-sectional view of the exemplary airflow nozzle of FIG. 22.

Notably, for the exemplary turbofan engine 10 described above with reference to, e.g., FIGS. 19 and 21, the airflow delivery system 186 is configured to provide the swirl airflow 190 generally in a direction aligned with a reference plane defined by the radial direction R and circumferential direction C (i.e., the plane depicted in FIG. 21). However, in other exemplary embodiments, the airflow delivery system 186 may instead be configured to provide the swirl airflow 190 at an angle greater than zero with the reference plane defined by the radial direction R and the circumferential direction C. For example, referring now briefly to FIG. 25, providing a cross-sectional view of an airflow nozzle 206 in accordance with another exemplary embodiment of the present disclosure, the airflow delivery system 186 may be configured to provide the swirl airflow 190 at an angle 216 between, e.g., about five degrees and about fifty degrees, such as between about ten degrees and about thirty-five degrees with the reference plane defined by the circumferential direction C of the radial direction R. With these embodiments, the airflow nozzles 206 may be referred to as "swept" airflow nozzles.

It should be appreciated, however, that in still other exemplary embodiments, the airflow delivery system 186 of the turbofan engine 10 he have any other suitable configuration. For example, referring now also to FIG. 26, a cross-sectional view of a section of an outer nacelle 50 defining openings 188 in accordance with another exemplary embodiment of the present disclosure is provided. The cross-sectional view of FIG. 6 may be the same view provided in FIG. 21, taking along Line 21-21 of FIG. 19.

Figure 26:
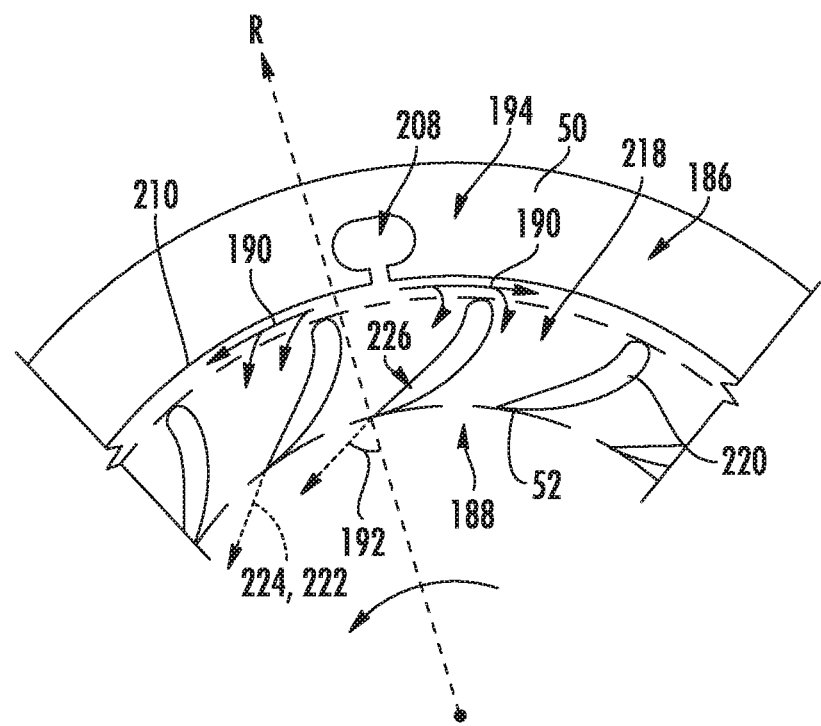
FIG. 26 is a schematic, cross-sectional view of an outer nacelle and a portion of an airflow distribution system of a gas turbine engine accordance with another exemplary embodiment of the present disclosure.

Additionally, the embodiment of FIG. 26 may be similar to the exemplary embodiment of FIG. 19, described above. For example, as is depicted, the outer nacelle 50 generally includes an inner wall 52 defining a plurality of openings 188 and the airflow delivery system 186 generally includes an air tube 194. The air tube 194 extends between an inlet 196 and an outlet 198, the outlet 198 being in airflow communication with the plurality of openings 188 and the inlet 196 being in airflow communication with a high pressure air source for receiving the swirl airflow 190 (see FIG. 19). Moreover, as with the exemplary embodiment of FIG. 19, the air tube 194 generally includes a supply air tube 208 and a distribution air tube 210, the distribution air tube 210 extending generally in a circumferential direction C within the outer nacelle 50.

However, for the embodiment of FIG. 26, instead of including a plurality of extension air tube 212 (see FIG. 21), the airflow delivery system 186 includes a plenum 218. The plenum 218 is generally configured as an annular plenum extending circumferentially within the outer nacelle 50 around the openings 188 and between the distribution air tube 210 the inner wall 52 of the outer nacelle 50. Accordingly, for the embodiment depicted, the plenum 218 is defined at least in part by the inner wall 52 of the outer nacelle 50 and the distribution air tube 210, as well as a forward wall and an aft wall (not shown). However, in other exemplary embodiments, the plenum 218 may be defined by any other suitable components of, e.g., the outer nacelle 50 and/or the airflow delivery system 186.

Figure 27:
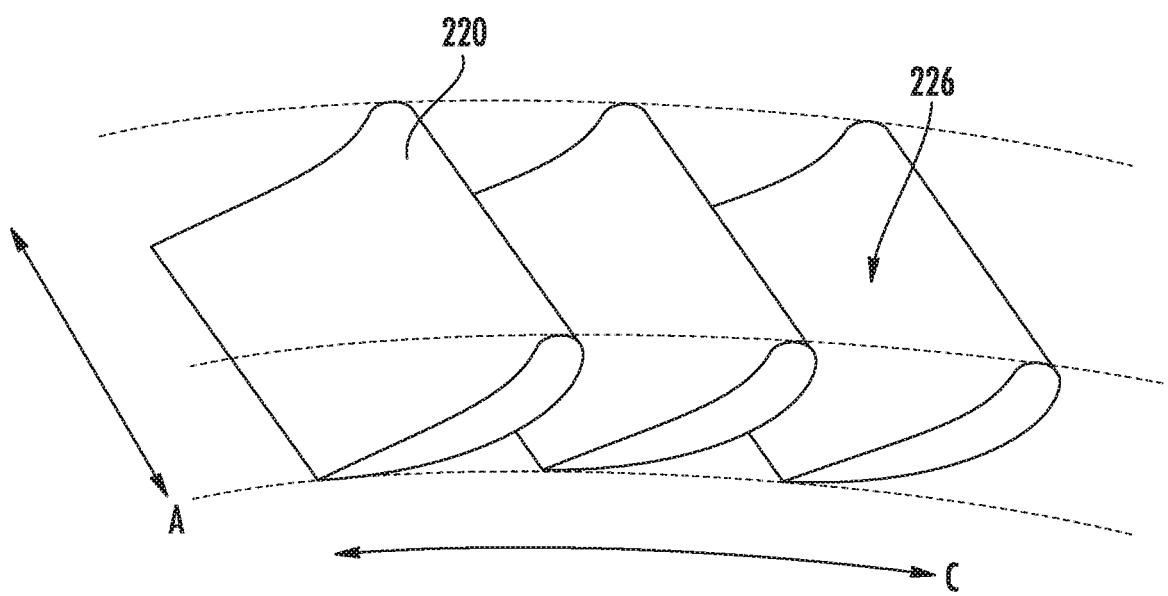
FIG. 27 is a perspective view of a plurality of swirl features of the exemplary airflow distribution system of FIG. 26 in accordance with an exemplary embodiment of the present disclosure.

Moreover, for the exemplary embodiment depicted, the airflow distribution system 186 further includes a plurality of swirl features positioned within the plenum 218 for directing the swirl airflow 190 through the plenum 218 to the openings 188. More specifically, referring now also to FIG. 27, providing a perspective view of a portion of the plurality of swirl features of the airflow distribution system 186 of FIG. 26, for the embodiment depicted, each of the plurality of swirl features is configured as an airfoil 220 extending generally between the distribution air tube 210 and the inner wall 52 of the nacelle 50. As will be appreciated, the plurality of airfoils 220 are configured to swirl the airflow 190 provided to the plenum 218 prior to such airflow 190 being provided through the plurality of openings 188 in the inner wall 52 of the nacelle 50.

Further, as is depicted, each of the plurality of airfoils 220 generally defines an airflow direction 222, the airflow direction 222 being the direction in which the swirl airflow 190 is provided through the openings 188 of the inner wall 52. For the embodiment depicted, the airflow direction 222 may be substantially equal to a direction of a reference line 224 defined by a trailing edge of a pressure side 226 of the respective airfoil 220, the reference line 224 being defined by the aft twenty percent of the pressure side 226. More specifically, the reference line 224 is defined by the aft twenty percent of the pressure side 120, as measured along a chord line of the respective airfoil 220. Notably, when the aft twenty percent the pressure side 226 defines a curve, the reference line 224 may be straight-line average fit of such curve (e.g., using least mean squares).

Additionally, for the embodiment depicted the airflow direction 222 (and reference line 224) defines a swirl angle 192. Accordingly, for the embodiment depicted, the swirl angle 192 may refer to an angle between the airflow direction 222 of a respective airfoil 220 and the radial direction R of the turbofan engine 10, or more specifically, for the embodiment depicted, the swirl angle 192 refers to an angle between the airflow direction 222 and a reference plane defined by the radial direction R and the axial direction A of the turbofan engine 10. In certain exemplary embodiments, the swirl angle 192 is between five degrees and thirty-five degrees. For example, in certain embodiments the swirl angle 192 may be between ten degrees and thirty degrees, such as between fifteen degrees and twenty-five degrees.

Further, the airflow distribution system 186 may include any suitable number of airfoils 220 within the plenum 218, such as between about five airfoils 220 and about one hundred airfoils 220. For example, in certain embodiments, airflow distribution system 186 of FIG. 26 may include the same number of airfoils 220 as, e.g., the exemplary turbofan engine 10 described above with reference to FIGS. 1 through 3 includes part span inlet guide vanes 100. For example, in certain exemplary embodiments, the airflow distribution system 186 may include at least twenty airfoils 220, such as at least thirty airfoils 220, and up to about fifty airfoils 220, such as up to about forty-five airfoils 220.

Figure 28:
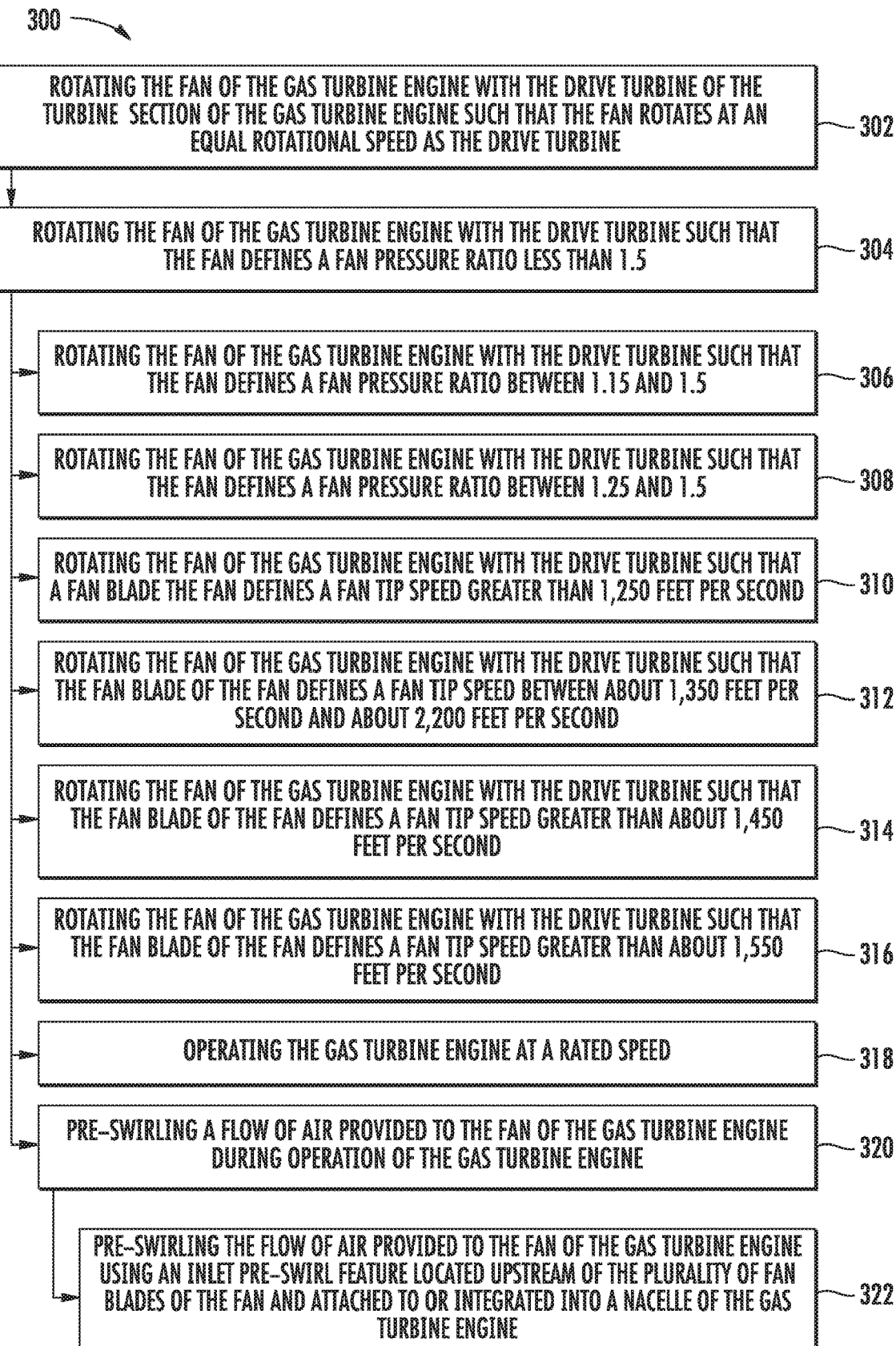
FIG. 28 is a flow diagram depicting a method for operating a gas turbine engine in accordance with an exemplary aspect of the present disclosure.

Referring now to FIG. 28, a flow diagram is provided of a method 300 for operating a direct drive gas turbine engine in accordance with an exemplary aspect of the present disclosure. The exemplary direct drive turbofan engine may be configured in accordance with one or more the exemplary gas turbine engines described above with reference to FIGS. 1 through 27. Accordingly, for example, the direct drive gas turbine engine may include a turbine section having a drive turbine and a fan section having a fan driven by the drive turbine.

The exemplary method 300 generally includes at (302) rotating the fan of the gas turbine engine with the drive turbine of the turbine section of the gas turbine engine such that the fan rotates at an equal rotational speed as the drive turbine. Additionally, for the exemplary aspect depicted, rotating the fan of the gas turbine engine with the drive turbine at (302) include at (304) rotating the fan of the gas turbine engine with the drive turbine such that the fan defines a fan pressure ratio less than 1.5. More specifically, for the exemplary aspect depicted, rotating the fan of the gas turbine engine at (304) further includes at (306) rotating the fan of the gas turbine engine with the drive turbine such that the fan defines a fan pressure ratio between 1.15 and 1.5, and further still at (308) rotating the fan of the gas turbine engine with the drive turbine such that the fan defines a fan pressure ratio between 1.25 and 1.5.

Referring still to FIG. 28, rotating the fan of the gas turbine engine with the drive turbine at (304) further includes at (310) rotating the fan of the gas turbine engine with the drive turbine such that a fan blade the fan defines a fan tip speed greater than 1,250 feet per second. More specifically, for the exemplary aspect depicted, rotating the fan of the gas turbine engine with the drive turbine at (304) further includes at (312) rotating the fan of the gas turbine engine with the drive turbine such that the fan blade of the fan defines a fan tip speed between about 1,350 feet per second and about 2,200 feet per second. More specifically, still, for the exemplary aspect depicted, rotating the fan of the gas turbine engine with the drive turbine at (304) further includes at (314) rotating the fan of the gas turbine engine with the drive turbine such that the fan blade of the fan defines a fan tip speed greater than about 1,450 feet per second, and at (316) rotating the fan of the gas turbine engine with the drive turbine such that the fan blade of the fan defines a fan tip speed greater than about 1,550 feet per second.

Further, as is also depicted, for the embodiment FIG. 28, rotating the fan of the gas turbine engine with the drive turbine at (304) includes at (318) operating the gas turbine engine at a rated speed. For example, operating the gas turbine engine at the rated speed at (318) may include operating the gas turbine at a maximum speed to produce a maximum rated power.

Moreover, the exemplary method 300 further includes at (320) pre-swirling a flow of air provided to the fan of the gas turbine engine during operation of the gas turbine engine. For the exemplary aspect depicted, pre-swirling the flow of air at (320) includes at (322) pre-swirling the flow of air provided to the fan of the gas turbine engine using an inlet pre-swirl feature located upstream of the plurality of fan blades of the fan and attached to or integrated into a nacelle of the gas turbine engine. In certain exemplary aspects, the inlet pre-swirl feature may be configured in accordance with one or more of the exemplary inlet pre-swirl features described above with reference to FIGS. 1 through 27. By way of example only, in certain exemplary aspects, pre-swirling the flow of air at (322) may include one or more of the steps (408) through (414) of the exemplary method 400 described below. However, in other embodiments, any other suitable inlet pre-swirl feature and/or method may be utilized.

Operating a direct drive gas turbine engine in accordance with the exemplary aspect described above with reference to FIG. 28 may result in a more efficiently operated gas turbine engine. Further, when the airflow provided to the fan is pre-swirled, such may reduce an amount of separation or shock losses of the airflow with the fan despite the relatively high fan tip speeds at which the fan is operated.

Figure 29:
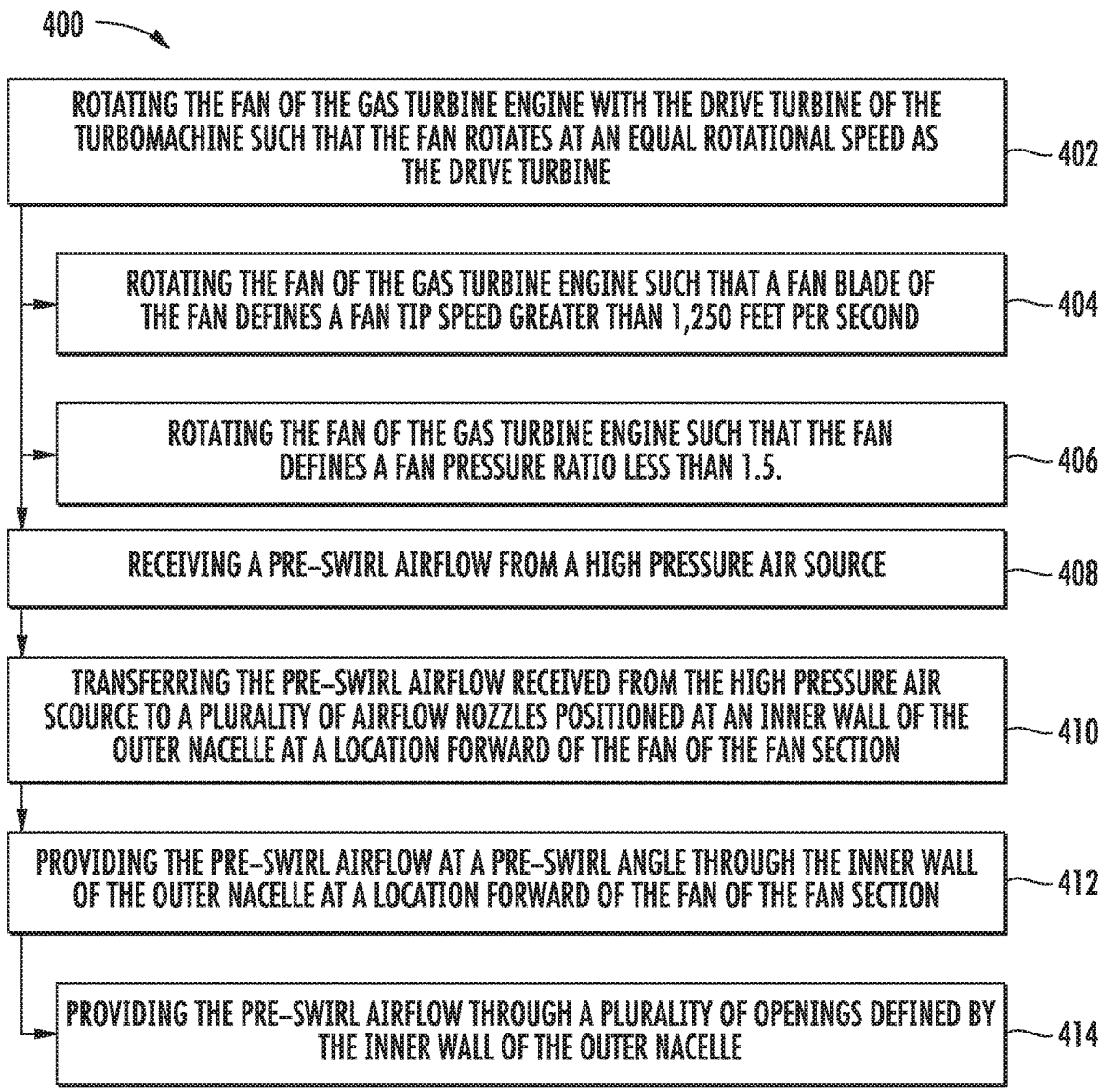
FIG. 29 is a flow diagram depicting a method for operating a gas turbine engine in accordance with another exemplary aspect of the present disclosure.

Referring now to FIG. 29, a flow diagram of a method 400 for operating a direct drive gas turbine engine in accordance with another exemplary aspect of the present disclosure is provided. The exemplary method 400 may be utilized with the exemplary gas turbine engines described above with reference to FIGS. 19 through 27. Accordingly, for example, the direct drive gas turbine engine may include a turbomachine, a fan section, and an outer nacelle, with the turbomachine including a drive turbine and the fan section including a fan.

Similar to the exemplary method 300, the exemplary method 400 includes at (402) rotating the fan of the gas turbine engine with the drive turbine of the turbomachine such that the fan rotates at an equal rotational speed as the drive turbine. For the exemplary aspect depicted, rotating the fan with the drive turbine at (402) includes at (404) rotating the fan of the gas turbine engine such that a fan blade of the fan defines a fan tip speed greater than 1,250 feet per second. Additionally, rotating the fan of the drive turbine at (402) further includes, for the exemplary aspect depicted, at (406) rotating the fan of the gas turbine engine such that the fan defines a fan pressure ratio less than 1.5.

Referring still to FIG. 29, the method further includes at (408) receiving a pre-swirl airflow from a high pressure air source and at (410) transferring the pre-swirl airflow received from the high pressure air source to a plurality of airflow nozzles positioned at an inner wall of the outer nacelle at a location forward of the fan of the fan section. In certain exemplary aspects, the high pressure air source may be, e.g., a bypass airflow passage of the direct drive gas turbine engine, or a compressor section of the direct drive gas turbine engine. Additionally, transferring the pre-swirl airflow at (410) may include, e.g., transferring the pre-swirl airflow through one or more air tubes or ducts defined within the direct drive gas turbine engine.

Further, the exemplary method 400 includes at (412) providing the pre-swirl airflow at a pre-swirl angle through the inner wall of the outer nacelle at a location forward of the fan of the fan section. For the exemplary aspect depicted, providing the pre-swirl airflow at the pre-swirl angle through the inner wall of the outer nacelle at (412) includes at (414) providing the pre-swirl airflow through a plurality of openings defined by the inner wall of the outer nacelle. More specifically, for the exemplary aspect depicted, providing the pre-swirl airflow through the plurality of openings defined by the inner wall of the outer nacelle at (414) includes providing the pre-swirl airflow through the plurality of airflow nozzles, each of the plurality of airflow nozzles positioned at, or in airflow communication with, a respective opening defined by the inner wall of the outer nacelle at a location forward of the fan of the fan section. It should be appreciated, however, that in other exemplary aspects, the gas turbine engine may not include the airflow nozzles, and instead may include any other suitable structure for providing the pre-swirl airflow through the plurality of openings at the pre-swirl angle at (414).

Further, for the exemplary aspect depicted, the pre-swirl angle at which the pre-swirl airflow is provided through the inner wall of the outer nacelle is between about five degrees and about thirty-five degrees. Additionally, the pre-swirl angle may be defined relative to, e.g., a radial direction of the direct drive gas turbine engine, or more specifically, relative to a plane defined by the radial direction and an axial direction of the gas turbine engine.

Operating a direct drive gas turbine engine in accordance with the exemplary aspect described above with reference to FIG. 29 may result in a more efficiently operated gas turbine engine. Further, when the airflow provided to the fan is pre-swirled, such may reduce an amount of separation or shock losses of the airflow with the fan despite the relatively high fan tip speeds at which the fan is operated.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas turbine engine defining an axial direction and a radial direction, the gas turbine engine comprising:
a turbomachine;
a fan rotatable by the turbomachine, the fan comprising a plurality of fan blades;
an outer nacelle surrounding the plurality of fan blades; and
a plurality of part-span inlet guide vanes cantilevered from the outer nacelle at a location forward of the plurality of fan blades along the axial direction, each of the plurality of part-span inlet guide vanes defining an inner end along the radial direction and being unconnected with an adjacent part-span inlet guide vane at the inner end, and each of the plurality of part-span inlet guide vanes defining a first swirl angle at a trailing edge proximate the inner end and a second swirl angle at the trailing edge proximate an outer end, and wherein the first swirl angle and the second swirl angle differ to provide a reduction in flow separation and/or shock losses.

2. The gas turbine engine of claim 1, wherein the plurality of part-span inlet guide vanes each define the outer end along the radial direction, and wherein each of the plurality of part-span inlet guide vanes is connected to the outer nacelle at the outer end.

3. The gas turbine engine of claim 1, wherein each of the plurality of part-span inlet guide vanes is completely supported by the outer nacelle at the respective outer end.

4. The gas turbine engine of claim 1, wherein the plurality of part-span inlet guide vanes define a solidity between about 0.5 and about 1.5.

5. The gas turbine engine of claim 1, wherein the plurality of part-span inlet guide vanes define a solidity between about 0.9 and 1.0.

6. The gas turbine engine of claim 1, wherein each of the plurality of part-span inlet guide vanes is configured as a variable part-span inlet guide vane.

7. The gas turbine engine of claim 1, wherein the plurality of part-span inlet guide vanes includes between twenty part-span inlet guide vanes and fifty part-span inlet guide vanes.

8. The gas turbine engine of claim 1, wherein the plurality of part-span inlet guide vanes includes between thirty part-span inlet guide vanes and forty-five part-span inlet guide vanes.

9. The gas turbine engine of claim 1, wherein each of the plurality of part-span inlet guide vanes defines a leading edge, the trailing edge, and a maximum swirl angle, and wherein the maximum swirl angle of each of the plurality of part-span inlet guide vanes at the trailing edge is between five degrees and thirty-five degrees.

10. The gas turbine engine of claim 1, wherein each of the plurality of part-span inlet guide vanes defines a leading edge, the trailing edge, and a maximum swirl angle, and wherein the maximum swirl angle of each of the plurality of part-span inlet guide vanes at the trailing edge is between twelve degrees and twenty-five degrees.

11. The gas turbine engine of claim 1, wherein the second swirl angle is greater than the first swirl angle.

12. The gas turbine engine of claim 1, wherein the inner end of each of the plurality of inlet guide vanes is movable generally along the radial direction between an extended position and a retracted position.

13. The gas turbine engine of claim 1, wherein the gas turbine engine further defines a circumferential direction, and wherein the plurality of part-span inlet guide vanes are spaced substantially evenly along the circumferential direction.

14. The gas turbine engine of claim 1, wherein the gas turbine engine further defines a circumferential direction, and wherein the plurality of part-span inlet guide vanes are spaced unevenly along the circumferential direction.

15. The gas turbine engine of claim 1, wherein the plurality of part-span inlet guide vanes each define a longitudinal axis, wherein the gas turbine engine further defines a circumferential direction, wherein the radial and circumferential directions together define a reference plane, and wherein the longitudinal axis of each of the plurality of part-span inlet guide vanes intersects the reference plane and defines a sweep angle with the reference plane between about ten degrees and about thirty degrees.

16. The gas turbine engine of claim 1, wherein the trailing edge of each of the plurality of part-span inlet guide vanes defines a non-linear sculpted shape.

17. The gas turbine engine of claim 1, further comprising:
a compensation air supply assembly in airflow communication with a high pressure air source to receive a compensation airflow, wherein the plurality of part-span inlet guide vanes each defines the trailing edge and a trailing edge opening, wherein the trailing edge opening is in airflow communication with the compensation air supply assembly to receive the composition airflow and provide such compensation airflow through the trailing edge opening during operation of the gas turbine engine.

18. A gas turbine engine defining an axial direction and a radial direction, the gas turbine engine comprising:
a turbomachine;
a fan rotatable by the turbomachine, the fan comprising a plurality of fan blades;
an outer nacelle surrounding the plurality of fan blades; and
a plurality of part-span inlet guide vanes cantilevered from the outer nacelle at a location forward of the plurality of fan blades along the axial direction, each of the plurality of inlet guide vanes defining an outer end along the radial direction and being completely supported by the outer nacelle at the respective outer end, and each of the plurality of part-span inlet guide vanes defining a first swirl angle at a trailing edge proximate an inner end and a second swirl angle at the trailing edge proximate the outer end, and wherein the first swirl angle and the second swirl angle differ to provide a reduction in flow separation and/or shock losses.

19. The gas turbine engine of claim 18, wherein each of the plurality of part-span inlet guide vanes is unconnected with an adjacent part-span inlet guide vane at the inner end.

20. The gas turbine engine of claim 18, wherein the plurality of part-span inlet guide vanes define a solidity between about 0.5 and about 1.5.

* * * * *